United States Patent
Luthe

(10) Patent No.: US 11,807,724 B2
(45) Date of Patent: Nov. 7, 2023

(54) MECHANOCHEMICAL PROCESS FOR PRODUCING VALUABLE PRODUCTS FREE FROM PERSISTENT ORGANIC POLLUTANTS AND OTHER ORGANOHALOGEN COMPOUNDS FROM WASTE COMPRISING PLASTICS AND PLASTIC LAMINATES

(71) Applicant: Gregor Luthe, Costa Da Caparica (PT)

(72) Inventor: Gregor Luthe, Costa Da Caparica (PT)

(73) Assignee: Gregor Luthe, Costa Da Caparica (PT)

( * ) Notice: Subject to any disclaimer, the term of this patent is extended or adjusted under 35 U.S.C. 154(b) by 92 days.

(21) Appl. No.: 16/963,184

(22) PCT Filed: Jan. 15, 2019

(86) PCT No.: PCT/EP2019/000013
§ 371 (c)(1),
(2) Date: Jul. 17, 2020

(87) PCT Pub. No.: WO2019/141504
PCT Pub. Date: Jul. 25, 2019

(65) Prior Publication Data
US 2021/0122898 A1    Apr. 29, 2021

(30) Foreign Application Priority Data
Jan. 20, 2018   (DE) .......................... 102018000418.0

(51) Int. Cl.
| | | |
|---|---|---|
| C08J 11/16 | (2006.01) | |
| B02C 17/00 | (2006.01) | |
| C08J 11/10 | (2006.01) | |
| C08J 11/14 | (2006.01) | |

(52) U.S. Cl.
CPC ............... *C08J 11/16* (2013.01); *B02C 17/00* (2013.01); *C08J 11/105* (2013.01); *C08J 11/14* (2013.01)

(58) Field of Classification Search
CPC .. B02C 17/00; C08J 11/00; C08J 11/04; C08J 11/105; C08J 11/14; C08J 11/16; Y02P 20/143; Y02W 30/62
See application file for complete search history.

(56) References Cited

U.S. PATENT DOCUMENTS

| | | | |
|---|---|---|---|
| 3,547,848 A | 12/1970 | Marsh et al. | |
| 3,781,379 A | 12/1973 | Theodore et al. | |
| 4,091,048 A | 5/1978 | Labana et al. | |
| 4,181,642 A | 1/1980 | Holle et al. | |
| 4,311,622 A | 1/1982 | Buter | |
| 4,383,068 A | 5/1983 | Brandt | |
| 4,444,954 A | 4/1984 | Mels et al. | |
| 4,939,213 A | 7/1990 | Jacobs, III et al. | |
| 5,084,541 A | 1/1992 | Jacobs, III et al. | |
| 5,288,865 A | 2/1994 | Gupta | |
| 5,889,106 A | 3/1999 | Kurek et al. | |
| 5,981,653 A | 11/1999 | Wilmes et al. | |
| 6,020,369 A | 2/2000 | Schinazi et al. | |
| 6,128,523 A | 10/2000 | Bechtold et al. | |
| 6,291,579 B1 | 9/2001 | Kalck et al. | |
| 6,403,699 B1 | 6/2002 | Rockrath et al. | |
| 7,097,858 B2 | 8/2006 | Hill et al. | |
| 2005/0256359 A1* | 11/2005 | Bolsing ..................... A62D 3/38 588/320 |
| 2007/0227303 A1 | 10/2007 | Rimmer | |
| 2017/0036967 A1 | 2/2017 | Sevast'Yanov et al. | |

FOREIGN PATENT DOCUMENTS

| | | |
|---|---|---|
| DE | 1805693 A1 | 2/1970 |
| DE | 2214650 A1 | 10/1972 |
| DE | 2359923 A1 | 6/1974 |
| DE | 2751761 A1 | 6/1978 |
| DE | 2749576 A1 | 5/1979 |
| DE | 4240545 A1 | 7/1993 |
| DE | 19617086 A1 | 10/1997 |
| DE | 19631269 A1 | 2/1998 |

(Continued)

OTHER PUBLICATIONS

Office translation of JP 3305993, Saito et al, dated Sep. 12, 2000 (Year: 2000).*
Boldyrev V. et al., "Mechanochemistry of Solids: Past, Present, and Prospects" *Journsals of Materials Synthesis and Processing*, vol. 8, 2000, 12 pages.
Butyagin Y. P. et al., "The Kinetics and Energy Balance of Mechanochemical Transformations," Physics of the Solid State, vol. 47, No. 5, 2005, 856-852;.
G. Cagnetta et al. "Mechanochemical conversion of brominated POPs into useful oxybromides: a greener approach," Sci. Rep., 2016, 6, 28394.
Gratz S. et al., "Mechanochemical polymerization—controlling a polycondensation reaction between a diamine and a dialdehyde in a ball mill" RCS Adv., 2016, 6, 64799-64802.

(Continued)

*Primary Examiner* — Frances Tischler
(74) *Attorney, Agent, or Firm* — Steinfl + Bruno LLP

(57) ABSTRACT

A mechanochemical process for preparation of valuable products free from persistent organic contaminants and other organic halogen compounds, from waste of non-mixed and mixed, plastics and plastic laminates which is contaminated with persistent organic contaminants and/or contain the organic halogen compounds. Shredded waste is filled into a mill containing milling balls and is further shredded by milling. At least one dehalogenating agent is added. The mixture is milled further, and milling is stopped after a set time period. Before or after this step a further additive is added. The resulting products are separated from the milling balls, and the resulting halogen containing water-soluble products are jettisoned by washing with aqueous solvents and/or the resulting halogen containing, water-insoluble products are not washed out, but remain in the valuable products as fillers. Valuable products prepared in accordance with the process, and methods for their use are also provided.

7 Claims, No Drawings

(56) References Cited

FOREIGN PATENT DOCUMENTS

| | | |
|---|---|---|
| DE | 19652813 A1 | 6/1998 |
| DE | 19840405 A1 | 4/1999 |
| DE | 19805421 C1 | 6/1999 |
| DE | 19809643 A1 | 9/1999 |
| DE | 69911502 T2 | 7/2004 |
| DE | 102014101766 A1 | 8/2015 |
| DE | 102015010041 A1 | 2/2017 |
| EP | 0004571 A1 | 10/1979 |
| EP | 0008127 A1 | 2/1980 |
| EP | 0192304 A1 | 8/1986 |
| EP | 0245700 A2 | 11/1987 |
| EP | 0249201 A2 | 12/1987 |
| EP | 0276501 A2 | 8/1988 |
| EP | 0582051 A2 | 2/1994 |
| EP | 0604922 A1 | 7/1994 |
| EP | 0963825 A1 | 12/1999 |
| EP | 0963825 B1 | 9/2003 |
| EP | 1303460 B1 | 3/2006 |
| EP | 1681270 A2 | 7/2006 |
| EP | 0940459 B1 | 8/2006 |
| EP | 1830824 B1 | 1/2016 |
| GB | 1338204 A | 11/1973 |
| JP | 2000172427 A | 6/2000 |
| JP | 2000248110 A | 9/2000 |
| JP | 3099064 B2 | 10/2000 |
| JP | 2002030003 A | 1/2002 |
| JP | 3305993 B2 | 7/2002 |
| WO | 94/22968 A1 | 10/1994 |
| WO | 97/12945 A1 | 4/1997 |

OTHER PUBLICATIONS

Haoliang J. et al. "Formation of nanocrystalline TiC from titanium and different carbon sources by mechanical alloying," Journal of Alloys and Compounds, 472 (2009) 97-103.

International Preliminary Report on Patentability for International Application No. PCT/EP2019/000013 filed on Jan. 15, 2019 on behalf of Technik und Recht dated Jul. 21, 2020 12 pages (English + Original).

International Search Report for International Application No. PCT/EP2019/000013 filed on Jan. 15, 2019 on behalf of Technik und Recht dated Apr. 12, 2019 5 pages (English + Original).

P. Balaz et al., "Hallmarks of mechanochemistry: from nanoparticles to technology," Chem. Soc. Rev., 42, 2013, 7571-7637.

S. A. Steiner III et al., "Circumventing the Mechanochemical Origins of Strength Loss in the Synthesis of Hierarchical Carbon Fibers," Applied Materials & Interfaces, 2013, 4892-4903.

S. Motozuka et al. "Mechanochemical surface modification of carbon fibers using a simple rubbing method," Journal of Composite Material 0 (0) 1-8, 2017.

Takacs L. et al., "Mechanochemistry and the Other Branches of Chemistry: Similarities and Differences," Acta Physica Polonica, vol. 121 (2012), 3, 711-714.

Tan Xing et al. "Ball milling: a green approach for synthesis of nitrogen doped carbon nanoparticles," Nanoscale, 2013, 5, 7970-7976.

V. V. Boldyrev, "Mechanochemistry and mechanical activation of solids", Russian Chemical Reviews, 75 (3) 177-189 (2006).

W. Tongamp et al. "Simultaneous treatment of PVC and oyster-shell wastes by mechanochemical means," Waste Management 28 (2008) 484-488.

Written Opinion for International Application No. PCT/EP2019/000013 filed on Jan. 15, 2019 on behalf of Technik und Recht dated Apr. 12, 2019 10 pages (English + Original).

Cavalierie, F., et al., "Development of composite materials by mechanochemical treatment of post-consumer plastic waste," Waste Management, 22 (Dec. 2002). 913-916. 4 Pages.

Ctistis, G., et al., "PCDDs, PCDFs, and PCBs co-occurence in TiO2 nanoparticles," Environmental Science and Pollution Research (Published online Nov. 2015). DOI 10.1007/s11356-015-5628-7. 9 Pages.

Fontaine, J., et al., "Tribochemistry between hydrogen and diamond-like carbon films," Surface Coatings Technology, 146-147 (Apr. 2001). 286-291. 6 Pages.

Friščić, T., "Supramolecular concepts and new techniques in mechanochemistry: cocrystals, cages, rotoxanes, open metal-organic frameworks," Chem. Soc. Rev., 41 (Sep. 2012). 3493-3510. 18 Pages.

Guo, X., et al., "A review of Mechanochemistry Applications in Waste Management," Waste Management 30 (Oct. 2009). 4-10. 5 Pages.

Hautmann, V.D., "Gerhard Dust und Gunther Plötner fertigen stapelbare Steine aus Wüstensand. Menschen in Slums sollen sich daraus selb3st ein Zuhause bauen können," Technology Review (Jul. 2017). 71-72. 5 Pages. German + Machine Translation.

James, S.L., et al., "Mechanochemistry: opportunities for new and cleaner synthesis," Chem. Soc. Rev., 41 (Sep. 2011). 413-447. 35 Pages.

Leistenschneider, D., et al., "Mechanochemistry-assisted synthesis of hierarchical porous carbons applied as supercapacitors," Beilstein J. Org. Chem., 13 (Jul. 6, 2017). 1332-1341. 10 Pages.

Materialsgate Newsletter "Tribologie: Simulation zeigt auf molekularer Ebene bislang unbekannte Reibungsmechanismen," (Downloaded on Dec. 9, 2017). 4 Pages. German Original + Machine Translation.

Von Gregor H., et al., "Der Plastikstrom", Horizonte Kunststoffe, MIT Technology Review (Jul. 2017). pp. 54-55. German Original + Machine Translation. 2 Pages.

\* cited by examiner

MECHANOCHEMICAL PROCESS FOR PRODUCING VALUABLE PRODUCTS FREE FROM PERSISTENT ORGANIC POLLUTANTS AND OTHER ORGANOHALOGEN COMPOUNDS FROM WASTE COMPRISING PLASTICS AND PLASTIC LAMINATES

CROSS-REFERENCE TO RELATED APPLICATIONS

The present application is the U.S. National Stage of International Patent Application No. PCT/EP2019/000013 filed on Jan. 15, 2019 which, in turn, claims priority to German Patent Application No. DE 102018000 418.0 filed on Jan. 20, 2018.

The present invention relates to a mechanochemical process for the production of valuable products from plastic and plastic laminate waste, which valuable products are free from persistent organic contaminants and other organic halogen compounds.

Furthermore, the present invention relates to the valuable products produced from plastic and plastic laminate waste by the said mechanochemical process, which valuable products are free from persistent organic contaminants and other organic halogen compounds.

Moreover, the present invention relates to the valuable products free from persistent organic contaminants and other organic halogen compounds producible by the said a mechanochemical process.

Last but not least, the present invention relates to the use of the valuable products, which are free from persistent organic contaminants and other organic halogen compounds.

BACKGROUND OF THE INVENTION

Prior Art

Worldwide, the handling and the use of plastic wastes cause numerous ecological and economical problems.

Thus, the waste management in Germany utilizes the collected plastic waste nearly completely. In the year 2015, it has used 45% of all the collected plastic waste in material recycling and 1% as raw material. 53% of the waste was used energetically. However, for reasons of protecting the climate and from the vantage point of the protection of the environment, it is important that more plastic waste is recycled.

In the year 2015, the plastics industry processed about 12.06 million tons (Mio.t) of plastics, as for example, packaging. After the adjustments of the exports and imports, the consumption of plastics in Germany was in the range of about 10.1 million tons. This was 2.6% or rather 4.6% more consumption than in the year 2013. In the same time period, the amount of plastic waste increased about 4.23% to 5.92 million tons. Besides the production of plastics for the manufacture of plastic materials, also 8.35 million tons of polymers were produced for adhesives, coatings and resins.

73.9% of the produce plastics could be attributed to the following five thermoplastics: 2.8 million tons of polyethylene (PE), 2.0 million tons of polypropylene (PP), 1.55 million tons of polyvinyl chloride (PVC), 535,000 tons of polystyrene and expanded polystyrene (PS/PS-E) and 615,000 tons of polyamide (PA). About 15% of the total quantity produced were other thermoplastics such as polycarbonate (PC), polyethylene terephthalate (PET) or styrene copolymers such as acrylonitrile-butadiene-polystyrene (ABS) or styrene-acrylonitrile (SAN). The remaining 11% were miscellaneous plastics such as thermosets like polyurethanes, polyesters and formaldehyde resins.

In the year 2015, 5.92 million tons of plastic waste accrued in Germany. Approximately 84.5% of this waste resulted after the use of the plastics. The remaining 15.5% resulted during the production and, in particular, during the processing of the plastics. Of these 5.92 million tons of plastic waste, 2.74 million tons corresponding to 46% were recycled or used as raw materials. 3.14 million tons corresponding to 53% were utilized energetically—from these, 2.05 million tons in waste incineration plancton.

Only 33.5% of the plastic waste generated by private or commercial final consumption are used. The reasons for these differing quotas are that the plastics result in the industry mostly very clean and unmixed, whereas they result in households and many commercial enterprises contaminated and mixed. However, from the vantage point of the protection of the environment, it makes sense to increasingly siphon off used plastics and to put them to a use as high-grade as possible.

Worldwide, the situation is much worse: plastic waste in the oceans is a worldwide problem. According to a white paper, published in the beginning of the year 2015 in the scientific journal Science, in the year 2015 about 8 million tons of this waste got into the oceans, whereby the confidence interval was specified to be 4.8 to 12.7 million tons per year. Plastic parts, primary micro plastic and the corresponding decomposition products, collect themselves, particularly in some flow vortexes of oceanic drifts. In the long run, plastic waste drifting in the seas is comminuted by the motion of the waves and by UV-light, whereby an increasingly higher degree of fineness, culminating in pulverization can be reached. At a high degree of fineness, the plastic powder is taken up by various marine dwellers including also plankton instead of or together with the regular food. Starting from the plankton, the amounts of plastic particles to which also toxic and carcinogenic chemicals like DDT and polychlorinated biphenyls can adhere, can increase. This way, the plastic waste with the adhered poisonous substances can reach the foodstuff intended for human consumption. Various projects and scientists dedicate themselves to collect the small plastics in the seas: Fishing for Litter, incentives for fishermen of the German Green-Ocean e.V., The Ocean Cleanup or the waste collecting ship Sea Cow.

The plastic waste is processed with different methods.

The Recycling of Unmixed Wastes: Clean and Unmixed Wastes

Clean and unmixed wastes (mostly production wastes from the industry) are mainly processed—if necessary after cleaning with water—with customary methods of plastic processing, such as, for example, extrusion, injection molding, transfer molding, intrusion and compaction pressing. For the processing of clean, unmixed plastic waste to yield recycled materials, conventional single-screw or double-screw extruders are used. In order to fulfill the high quality demands, the purity of the polymers is of high importance. In order to gather all contaminants, the separation takes place in a melt stream (melt filtration) between the extruder and the extrusion die.

The Recycling of Mixed Wastes:

A broad spectrum of mixed and contaminated plastic waste can be used in the compaction pressing process. Large-scale plates having a thickness up to 60 mm result. However, discolorations and mechanical defects which are caused by the incompatibility of many plastics make the products appear less attractive.

Thermal Processes:

Thermal processes such as pyrolysis and visbreaking are known methods of the petrochemical industry. Used plastics are processed when the objective is to decrease the chain length of the polymers to an extent that the output streams from the treatment process can be used in other chemical or energetic processes. Furthermore, other special methods, such as the paint stripping of plastic parts or the separation of multilayer laminates—the latter only in the case of production wastes—are used. To what extent such processes can also be used economically for disassembled plastic parts (postconsumer) is presently not known. Despite great efforts, there still remain fractions in power plants with circulating fluidized beds for the co-combustion of plastic waste, the recycling or raw material usage of which is not possible or expedient for technical, economical or ecological reasons. After the inception of the waste deposition regulation in Germany on Jun. 1, 2005, the deposition of such materials is no longer possible because only inert products having an ignition loss of less than 5% by weight are allowed to be deposited. With the thermal methods there is always the danger that persistent organic contaminants are produced.

The Usage as Raw Materials:

The usage as raw materials is generally understood as the thermal splitting of polymer chains to yield petrochemical raw materials such as oils and gases, which can be used for the manufacture of new plastics or for other purposes. In cases where the recycling is not feasible, the use of waste plastics as raw materials as role materials is another possibility for the utilization, such as gassing, thermal utilization, cracking and hydration (with regard to the problem cf. also "Der Plastikstrom", Horizonte Kunststoffe, Technology Review, July 2017, pages 54 and 55). One has also tried to tackle the problems which are caused by the plastic wastes with the help of the special physicochemical effects and mechanisms offered by the mechanochemistry.

Because of the mechanical and physical forces. Structural changes occur at the surface: surface enlargements, decreases of particle sizes, generation of fresh surfaces, material, abrasions and, partly, also phase changes. On a microscopic scale, highly excited lattice vibrations occur which would not arise thermally. This makes numerous exotic chemical reactions possible.

The special physicochemical effects and mechanisms are subject matter of numerous theoretical investigations, as for example, the papers of V. V. Boldyrev, Mechanochemistry and mechanical activation of solids, in Russian Chemical Reviews, 75 (3) 177-189 (2006);

P. Yu. Butygain and A. N. Streletskii, The Kinetics and Energy Balance of Mechanochemical Transformations, in Physics of the Solid State, Vol. 47, No. 5, 2005, 856-852;

J. Fontaine et al. Tribochemistry between hydrogen and diamond-like carbon films, in Surface Coatings Technology 146-147 (2001) 286-291;

L. Takacs, Mechanochemistry and the Other Branches of Chemistry: Similarities and Differences, in Acta Physica Polonica A, Vol. 121 (2012), 3, 711-714;

S. A. Steiner III et al., Circumventing the Mechanochemical Origins of Strength Loss in the Synthesis of Hierarchical Carbon Fibers, in Applied Materials & Intefaces, 2013, 4892-4903; oder MaterialsgateNewsletter Dec. 9 2017, Tribologie: Simulation zeigt auf molekularer Ebene bislang unbekannte Reibungsmechanismen.

Furthermore, review articles give an overview over the historical development and the perspective of the mechanochemistry, such as the papers of S. L. James et al., Mechanochemistry: opportunities for new and cleaner synthesis, in Chem. Soc. Rev., 2012, 41, 413-447, wherein the syntheses of inorganic materials such as alloys, oxides, halides, sulfides, nitrides and composites, co-crystals like charge transfer co-crystals, acid-base co-crystals, ionic co-crystals and the organic catalysis by co-crystallization, new forms of pharmaceuticals like pharmaceutical co-crystals, and organic syntheses with the formation of carbon-carbon and carbon-X bonds like stoichiometric organic reactions, metal catalyzed organic reactions, organically catalyzed asymmetric reactions synthesis of ligands and post-case systems, the synthesis of metal complexes and the synthesis of coordination polymers (MOFs) reported;

P. Balaz et al., Hallmarks of mechanochemistry: from nanoparticles to technology, in Chem. Soc. Rev., 42, 2013, 7571-7637; or Tomislav Friscic, Supramolecular concepts and new techniques in mechanochemistry: cocrystals, cages, rotoxanes, open metal-organic frameworks, in Chem. Soc. Rev., 2012, 41, 3493-3510.

The mechanochemistry is also used for the solution of special problems and for syntheses.

Thus, F. Cavalierie und F. Padella describe in their paper: Development of composite materials by mechanochemical treatment of post-consumer plastic waste, in Waste Management, 22 (2002), 913-916 that a composit can be prepared by milling mixtures of polypropylen and polyethylene in liquid carbondioxide, which composit no longer shows the incompatibility of the two polymers and exhibits better properties than the starting polymers.

In their paper: Formation of nanocrystalline TiC from titanium and different carbon sources by mechanical alloying, in Journal of Alloys and Compounds, 472 (2009) 97-103, Haoliang Jia et al. describe the preparation of nanocrystalline titanium carbide from titanium powder and various carbon sources.

In their paper: Ball milling: a green approach for synthesis of nitrogen doped carbon nanoparticles, in Nanoscale, 2013, 5, 7970-7976, Tan Xing et al. describe an industrially applicable method for the synthesis of nitrogen doped carbon nanoparticles.

In their paper: Mechano-chemistry assisted synthesis of hierarchical porous carbon applied as supercapacitors in Beilstein Journal of Organic Chemistry, 2017, 13, 1332, L. Borchardt et al. describe the preparation of porous carbon from plant materials for the use in capacitors and electrodes.

In their paper: Mechanochemical surface modification of carbon fibers using a simple rubbing method, in Journal of Composite Materials 0 (0) 1-8, S. Motozuka et al. describe the surface modification of carbon fibers on the basis of polyacrylonitrile by mechanical attrition.

In their paper: Mechanochemical polymerization—controlling a polycondensation reaction between a diamine and a dialdehyde in a ball mill in RCS Adv., 2016, 6, 64799-64802, S. Gratz and L. Borchardt describe the mechanochemical polycondensation between a diamine and a dialdehyde offering an attractive alternative to customery methods.

In the conference report: AIP Conference Proceedings, Volume 1664, Issue 1, 150008 (2015), Recycling and Processing of several typical crosslinked polymer scraps with enhanced mechanical properties based on solid state mechanochemical milling, the authors describe the milling of partially devulcanized or de-crosslinked rubber tire scraps, post-vulcanized fluorocautchouc scraps and crosslinked polyethylen scraps, nachvulkanisierten Fluorkautschukschnitzeln und vernetzten Polyethylenschnitzeln from cable wastes yielding materials with improved mechanical properties.

Additional examples relating to the applicability of the mechanochemistry in different fields are disclosed by the following patent documents.

Thus, the German laid open patent application DE 10 2014 101 766 A1 discloses a process for the recovery and, where applicable, for the separation of lanthanides as chlorides or oxides from mineral waste and residual materials. In this process, powder particles are produced in a first step, which particles are thereafter activated mechanochemically.

The European patent EP 1 830 824 B1 discloses a process for the preparation of a nanoparticle composition which comprises nanoparticles of a therapeutic agent. In doing so, a mixture of a precursor compound and a co-reactant is milled using a grinding medium in a milling unit.

The American patent application US 2017/0036967 A1 discloses a process for the preparation of fertilizers on the basis of huminic acids from brown coal and leonardite in a mechanochemical reactor for highly viscous media.

In the international patent application WO/072527 A2, the mechanochemical preparation of zeolites is described.

The European patent application EP 1 681 270 A2 discloses the mechanochemical preparation of essentially iron-free metal chalcogenides or arsenides from iron-free metal powders and sulfur, selenium, tellurium or arsenic.

The European patent EP 1 303 460 B1 describes the mechanochemical synthesis of lithiated manganese dioxide and lithium salts.

The translation of the European patent document EP 0 963 825 B1, DE 699 11 502 T2, describes the mechanochemical treatment of plastics like polyethyleneterephthalate, polystyrene, polypropylene or polyethylene in the presence of liquid carbon dioxide for compatibilizing and recycling of heterogeneous plastics won from municipal and industrial wastes.

The German laid-open patent application DE 42 40 545 A1 discloses a process fort the preparation of peptides with the help of proteolytic sssss, wherein amino-protected amino acids as acylating components are reacted with carboxyl-protected amino acids in the presence of a crystal water containing substance such as $Na_2CO_3 \times 10H_2O$ by milling.

The Japanese patent JP 3099064 B2 discloses a mechanochemical process for the preparation of a thermoplastic composit material from a non-thermoplastic natural material, such as cellulose or chitin, and 5 to 20% by weight of a synthetic thermoplastic. The material composite material itself is thermoplastic.

From the Abstract of the Japanese patent application JP 2000-248110 A, a mechanochemical process for the dehalogenation of halogen containing plastics with metal oxides or metal hydroxides of calcium and strontium is known.

From the Abstract of the Japanese patent application JP 2000 1172427 A, a mechanochemical process for the dehalogenation of halogen containing plastics like PVC or flame retardant polyethylene with metal oxides, hydroxides and carbonates is likewise known.

From the DWPI-Abstract of the Japanese patent application JP 2002-030003 A, a mechanochemical process for the dehalogenation of tetrabromobisphenol A epoxy resins with sodium hydroxide is known.

To what extent the dehalogenation products are valuable products, is not known.

An additional problem of recycling of plastics, in particular of mixed plastics and plastic laminates, is the very high content of organically bound halogens, when, for example, PVC, PVDF, PTFE or chlorofluorinated thermoplastics are contained in the plastic wastes.

In their paper: Mechanochemical conversion of brominated POPs into useful oxybromides: a greener approach, in Sci. Rep., 2016, 6, 28394, G. Cagnetta et al. describe the decomposition of brominated persistent organic contaminants by way of the reaction with stoichiometric amounts of bismuth oxide or lanthanum oxide with formation of the corresponding oxybromides and amorphous carbon.

In their paper: Simultaneous treatment of PVC and oyster-shell wastes by mechanochemical means, in Waste Management 28 (2008) 484-488, W. Tongamp et al. describe the dechlorination of PVC with oyster shell wastes which yields calcium chloride, and organic products with double bonds.

The German patent DE 197 42 297 C2 discloses the mechanochemical process for the reductive dehalogenation of haloorganic compounds, wherein the compounds or the mixture of compounds with the addition of elemental alkaline metal, earth alkaline metal, aluminium or iron as reducing agents and ethers, polyethers, ammonia, amines, amides, trialkyl silanes, polyalkyl hydrogensiloxanes or metal nitrides, individually or in combination, as hydrogen source are milled in one step. This way, PCB or clophen contaminated sands or soils can be decontaminated mechanochemically.

However, not only the high organic halogen content of plastics like PVC, but also the lower, organic halogen content can cause problems in the recycling of plastics and plastic laminates. The reason for this is that even when the wastes do not contain organically bound halogens, ubiquitous persistent organic pollutants or long-lasting organic pollutants or POP, such as chloroorganic insecticides of the first generation as for example chlordane, DDT, dieldrin or toxaphen, industrially produced chemicals like PCB or side products of syntheses and combustion products like chlorinated or brominated dioxins or dibenzofurans build up unavoidably during the long-lasting outdoor use of the plastics and laminates. Representatives of these classes of compounds are also designated as "The Dirty Dozen". The POP are semivolatile and can occur in the gas phase as well as bound to dust particles and are distributed worldwide by long-range transport mechanisms. Due to their lipophilicity, bioaccumulation in the fatty tissue of animals and of humans occurs. Some of the POP are said to be endocrinal disruptors or carcinogenic and are also associated with infertility, behavioral disorders and immunodeficiency. Thus, they also contaminate in traces industrial scale products such as titanium dioxide nanoparticles, which are used as color pigments in cosmetics, inks and plastics. The amounts might be considered minimal in the single case, however, because of the large quantities of titanium dioxide in question, they cannot be neglected (cf. the paper of Georgios Ctistis, Peter Schön, Wouter Bakker and Gregor Luthe, PCDDs, PCDFs, and PCBs co-occurrence in $TiO_2$ nanoparticles, in Environmental Science and Pollution Research, DOI 10.1007/s11356-015-5628-7).

An additional problem arises upon recycling of mixed plastic laminates with metals. This problem must be solved for an economically useful process together with the other problems. This equally applies for plastics reinforced with glass fibers, carbon fibers, metal fibers and/or textile fibers, the particularities of which have to be considered.

Already due to the enormous amounts of plastic wastes in any form and composition, these problems must be solved. On the other hand, these plastic wastes provide a nearly inexhaustible and cheap source of raw materials for valuable products.

Another nearly inexhaustible and cheap source of raw materials is desert sand. It is polished into spherules by the wind so that no cement can keep it together. Therefore, the sand for the high-rises in Abu Dhabi must be imported from Indonesia, which has serious consequences: beaches disappear, islands slip off, sea currents change. These small particles have even become profitable contraband. In their paper, Technology Review, July 2017, 71-72, Gerhard Dust and Gunter Plötzner describe bricks made of desert sand containing 13% by weight polyester resin as the binder. According to the authors, this, concrete carries only 15% of the carbon dioxide load of conventional concrete. However, it's disadvantage is that it is more expensive than the conventional concrete. Therefore, it is desirable for economic and ecological reasons that bothsss nearly inexhaustible and cheap sources for raw materials are used for the preparation of valuable products.

OBJECTS OF THE PRESENT INVENTION

It was the object of the present invention to provide a novel mechanochemical process which makes it possible to produce valuable products which are free from persistent organic contaminants and organic halogen compounds and have completely different, new and/or better application properties and/or a broader range of uses than the original, plastics, and plastic laminates. It should furthermore be possible to prepare the valuable products in a cascade of millings steps, preferably in one milling step from unmixed and mixed plastic wastes and plastic laminates.

Moreover, it was the object of the present invention to use both raw material sources "plastic wastes and plastic laminate wastes" and "desert sand" together for the preparation of novel valuable products.

Additional objects become apparent in the following description.

THE INVENTIVE SOLUTION

Accordingly, the mechanochemical process for the production of valuable products which are free from persistent organic contaminants and other organic halogen compounds, from wastes of unmixed and mixed, plastics, and plastic laminates which are contaminated with persistent organic contaminants and/or contain other organic halogen compounds, has been found, wherein
 (i) the wastes are shredded so that an as narrow as possible particle size distribution results,
 (ii) the shredded wastes are filled into a mill containing grinding balls and are shredded further,
 (iii) a molar excess over the persistent organic contaminants and/or other organic halogen compounds present of least one dehalogenation agent is added,
 (iv) the mixture of milled shredded wastes and dehalogenation agents are milled further, and the milling is ended after a pre-chosen time period,
 (v) the resulting valuable products, which are free from persistent organic contaminants and other organic halogen compounds, are jettisoned from the grinding balls and the resulting halogen containing water-soluble products by washing with aqueous solvents and/or the resulting halogen-containing water-insoluble products are not washed out, but remain as fillers in the valuable products,
 (vi) after drying, the washed valuable products as well as the non-washed valuable products are tested as to whether they still contain persistent organic contaminants and/or other organic halogen compounds, whereby
 (vii) before and/or after the process step (iv) at least one additive, selected from the group consisting of reactive thinners, which can be cured thermally, and/or by actinic radiation radiation, low boiling organic solvents and high boiling organic solvents ("long solvents"), water, UV-absorbents, light protection agents, radical scavengers, thermolabile radical initiators, photoinitiators and co-initiators, cross-linking agents, which are customarily used in one-component systems, catalysts for the thermal cross-linking, deaerating agents, slip additives, polymerization inhibitors, defoamers, emulsifiers, wetting agents, dispersing agents and tensides, adhesion promoters, spreading agents, film forming agents, sag control agents (SCA), rheology additives (thickeners), flame retardants, siccatives, drying agents, anti-skinning agents, corrosion inhibitors, waxes, matting agents, reinforcing fibers, nanoparticles, microparticles, sands, precursors of organically modified ceramic materials, layered silicates polyoxometalates, inert gases, frozen gases, frozen liquids and liquids and reactive gases and liquids which (co)polymerize with the emerging and resulting valuable products, excited oxygen, organic and inorganic peroxides and ozone, is added.

Furthermore, the valuable products prepared in accordance with the mechanochemical process of the invention have been found.

ADVANTAGES OF THE INVENTION

In view of the prior art, it was surprised surprising and could not be expected by the skilled artisan that the object of the invention could be solved by way of the mechanochemical process of the invention and by the valuable products prepared by the mechanochemical process and by ssstheir use.

It was particularly surprising that with the help of the mechanochemical process of the invention, valuable products, which were free of persistent organic contaminants and other organic halogen compounds and had completely different, novel and/or better applicational properties and a broader range of uses than the original, plastics and plastic laminates, could be prepared in a cascade of milling steps, preferably in one milling step, from metal, organic halogen compounds and/or persistent organic contaminants containing unmixed and mixed plastic wastes and plastic laminate wastes.

Additional advantages flow from the following description.

DETAILED DESCRIPTION OF THE INVENTION

The plastic wastes can derive from thermoplastic polymers, polycondensation resins and/or (co-)polymers as well as their mixtures.

As the thermoplastic polymers, all customary and known linear and/or branched resins and/or blocklike, comblike and/or statistically structured polyaddition resins, polycondensation resins and/or (co-)polymers of ethylenically unsaturated monomers come into question.

Examples of suitable (co-)polymers are (meth)acrylate (co-)polymers and/or polystyrene, polyvinyl ester, polyvinyl ether, polyvinyl halides, polyvinyl amides, polyacrylonitrile, polyethylene, polypropylene, polybutylene, polyisoprene and/or their copolymers.

Examples of suitable polyaddition resins or polycondensation resins are polyesters, alkyds, polylactones, polycarbonates, polyethers, proteins, epoxy resin-amine adducts, polyurethanes, alkyd resins, polysiloxanes, phenol-formaldehyde resins, urea-formaldehyde resins, melamine-formaldehyde resins, cellulose, polysulfides, polyacetals, polyethyleneoxides, polycaprolactams, polylactides, polyimides and/or polyureas.

As is known in the art, thermosets are prepared from multifunctional, low molecular and/or oligomeric compounds by thermally initiated (co-)polymerization and/or by (co-)polymerization initiated by actinic radiation. As multifunctional, low molecular and/or oligomeric compounds, the reactive diluents, catalysts and initiators mentioned below come into question.

Moreover, wastes of polymer blends such as styrene/phenylene ether, poly amide/polycarbonate, ethylene-propylene-diene elastomers (EPDM), acrylonitrile-butadiene-styrene copolymers (ABS) or polyvinyl chloride/polyethylene can be reacted mechanochemically.

Furthermore, the plastic wastes can derive from functionalized polymers which contain the functional groups and/or the functional additives as hereinafter described.

Customary and Known Functional Groups

Fluorine, chlorine, bromine and iodine atoms; hydroxyl, thiol, ether, thioether, amino, peroxy, aldehyde, acetal, carboxyl, peroxycarboxyl, ester, amide, hydrazide and urethane groups; imide, hydrazone, hydroxime and hydroxamic acid groups; groups which derive from formamidine, formamidoxime, formamidrazone, formhydrazidine, formhydrazidoxime, formamidrazone, formoxamidine, formhydroxamoxime and formoxamidrazone; nitrile, isocyanate, thioisocyanate, isonitril, lactide, lactone, lactame, oxime, nitroso, nitro, azo, azoxy, hydrazine, hydrazone, azine, carbodiimide, azide, azane, sulfene, sulfene amide, sulfonamide, thioaldehyde, thioketone, thioacetal, thiocarboxylic acid, sulfonium, sulfur halide, sulfoxide, sulfone, sulfimine, sulfoximine, sultone, sultame, silane, siloxane, phosphane, phosphinic oxide, phosphonium, phosphoric acid, phosphorous acid, phosphonic acid, phosphate, phosphinate and phosphonate groups.

Customary and Known Functional Additives for Plastics

Examples of suitable additives are reactive thinners which can be cured thermally or by actinic radiation, low boiling organic solvents and high boiling organic solvents ("long solvents"), water, UV-absorbers, light protecting agents, radical scavengers, thermolabile radical initiators, photoinitiators and co-initiators, cross-linking agents as they are used in one-component systems, catalysts for the thermal cross-linking, defoamers, deaerating agents, siccatives, slip additives, polymerization inhibitors, emulsifiers, wetting agents, dispersing agents, and tensides, adhesion promoters, spreading agents, film forming agents, sag control agents (SCA), rheology agents (thickeners), flame retardants, drying agents, anti-skinning agents, corrosion inhibitors, waxes, matting agents, reinforcing fibers, sands, in particular desert sands, and precursors of organically modified ceramic materials.

Examples of suitable thermally curable reactive thinners are the isomeric diethyloctane diols or hydroxyl group containing hyperbranched compounds or dendrimers as they are disclosed, for example, in the German patent applications DE 198 05 421 A1, DE 198 09 643 A1 and DE 198 40 405 A1.

Examples of suitable reactive thinners which are curable by actinic radiation are described in Römpp Lexikon Lacke and Druckfarben, Georg Thieme Verlag, Stuttgart, New York, 1998, page 491 under the heading »Reaktivverdünner«. In the context of the present invention, actinic radiation means corpuscular radiation, like electron radiation, alpha radiation, beta radiation and proton radiation as well as electromagnetic radiation like IR-radiation, visible light, UV-radiation, x-rays and gamma rays. In particular, UV-radiation is used.

Examples of suitable low boiling organic solvents and high boiling organic solvents ("long solvents") are ketones like methyl ethyl ketone, methyl isoamyl ketone or methyl isobutyl ketone, esters like ethyl acetate, butyl acetate, ethylethoxy propionate, methoxypropyl acetate or butyl glycol acetate, ethers like dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes, and mixtures of aromatic and/or aliphatic hydrocarbons like Solventnaphtha™, benzene 135/180, dipentene or Solvesso™.

Examples of suitable thermolabile radical initiators are peroxides, organic azo compounds or C—C-splitting initiators like dialkyl peroxides, peroxocarboxylic acids, peroxodicarbonates, peroxoesters, ketone peroxides, azodinitriles or benzpinakolylsilylether.

Examples of suitable catalysts for the cross-linking are dibutyltin dilaurate, dibutyltin dioleate, lithium decanoate, zinc octoate or bismuth salts like bismuth lactate, or dimethylolpropionate.

Examples of suitable photoinitiators or co-initiators are described in Römpp Lexikon Lacke und Druckfarben, Georg Thieme Verlag Stuttgart, 1998, pages 444 bis 446.

Examples of additional cross-linking agents, as they are used in so-called one-component systems, are aminoplast resins, as they are described in Römpp Lexikon Lacke und Druckfarben, Georg Thieme Verlag, 1998, page 29, »Aminoharze«, in the textbook "Lackadditive", of Johan Bieleman, Wiley-VCH, Weinheim, New York, 1998, pages 242 and following, the textbook "Paints, Coatings and Solvents", second completely revised edition, Edit. D. Stoye and W. Freitag, Wiley-VCH, Weinheim, New York, 1998, pages 80 and following, in the patent documents U.S. Pat. No. 4,710, 542 A 1 or EP-B-0 245 700 A 1 and in the paper of B. Singh et al., "Carbamylmethylated Melamines, Novel Crosslinkers for the Coatings Industry", in Advanced Organic Coatings Science and Technology Series, 1991, volume 13, Seiten 193-207, carboxyl group containing compounds or resins, as they are described, for example, in the patent document DE 196 52 813 A 1, hypoxy group containing compounds or resins, as they are described for example in, the patent documents EP 0 299 420 A 1, DE 22 14 650 B 1, DE 27 49 576 B 1, U.S. Pat. No. 4,091,048 A or U.S. Pat. No. 3,781,379 A, blocked polyisocyanates, as they are described, for example, in the patent documents U.S. Pat. No. 4,444, 954 A, DE 196 17 086 A 1, DE 196 31 269 A 1, EP 0 004 571 A 1 or EP 0 582 051 A 1 and/or tris(alkoxycarbonylamino)-triazine, as they are described in the patent documents U.S. Pat. Nos. 4,939,213 A, 5,084,541 A, 5,288,865 A oder EP 0 604 922 A 1.

Examples for suitable deaerating agents are diazadicycloundecane oder benzoin.

Examples of suitable emulsifiers, wetting agents and dispersing agents, or tensides are the customary and known anionic, cationic, non-onionic and zwitterionic wetting agent, as they are described in detail, for example, in Römpp Online, April 2014, Georg Thieme Verlag, "Netzmittel".

An example of a suitable adhesion promoter is tricyclodecane dimethanol.

Examples of suitable film-forming agents are cellulose derivatives such as cellulose acetobyrate (CAB).

Examples of suitable transparent fillers are those on the basis of silicon dioxide, aluminum oxide or zirconium oxide; additionally, reference is made to Römpp Lexikon Lacke and Druckfarben, Georg Thieme Verlag, Stuttgart, 1998, pages 250-252.

Examples of suitable sag control agents are ureas, modified ureas and/or silicic acids, as they are described, for example, in the documents EP 0 192 304 A 1, DE 23 59 923 A 1, DE 18 05 693 A 1, WO 94/22968, DE 27 51 761 C 1, WO 97/12945 or "farbe+lack", 11/1992, pages 829 and following.

Examples of suitable rheology additives are known from the patent documents WO 94/22968, EP 0 276 501 A 1, EP 0 249 201 A 1 or WO 97/12945; cross-linked polymer microparticles, as they are disclosed, for example, by EP 0 008 127 A 1; inorganic layered silicates, such as aluminium-magnesium-silicate, sodium-magnesium- and sodium-magnesium-fluorine-lithium layered silicates of the montmorillonite type; silicic acids, such as Aerosil; or synthetic polymers with ionic and/or associating groups, such as wie polyvinylkohol, poly(meth)acrylamide, poly(meth)acrylic acid, polyvinylpyrrolidone, styrene-maleicacid anhydride or ethylene-maleicacid ahydride copolymere and their derivatives or hydrophobically modified ethoxylated polyurethanes and polyacrylates.

An example of a suitable matting agent is magnesium stearate.

Examples of suitable reinforcing fibers are carbon fibers, basalt fibers, boron fibers, glass fibers, ceramic fibers, silicic acid fibers, metallic reinforcing fibers such as steel fibers, Aramide fibers, Kevlar fibers, polyester fibers, nylon fibers, Teflon fibers, polyethylene fibers, polypropylene fibers, PMMA fibers, lignin fibers, cellulose fibers and other natural fibers, such as Seed Fibers:

Cotton, kapok, pappelflaum, akon, bamboo, nettle, hemp, jute, kenaf, linen, hops or china grass fibers;

Hard Fibers:

Pineapple, caroa, curaua, henequen, Newseeland flax, sisal or coconut fibers; Wool and fine animal hairs:

Wools from sheep, alpaka, lama, vikunja, guanaco or angora, rabbit fur, camel hair, caschmir and mohair;

Coarse Animal Hairs:

Cattle, horse or goat hair;

Silk:

Mulberry silk, tussah silk or mussel silk;

Mineral Fibers:

Erionite, attapulgite, sepiolithe or wollastonite fibers;

Cellulose Fibers:

Viskose, Modal, Lyocell, Cupro, Acetate or Triacetate fibers;

Rubber Fibers

Plant Protein Fibers:

Soja protein or zein and other prolamine fibers;

Protein Fibers:

Fibers on the basis of casein, albumines, collagen, glykoproteines, globulines, elastine, nucloproteines, histones, keratine, chromoproteines, protamines, fibrinogene, phosphoproteines, myosine, lipoproteines or hydrophobines; Fibers on the basis of starches and glucose:

Alginate or Chitosan Fibers;

Fibers on the Basis of Synthetic Biologically Polymers:

Polylactide fibers (PLA) and polyesters (cf. Biologisch abbaubare Polyester—Neue Wege mit Bismutkatalysatoren, DISSERTATION zur Erlangung des Grades eines Doktors der Naturwissenschaften des Fachbereichs Chemie der Universität Hamburg, vorgelegt von Gesa Behnken, aus Hamburg, Hamburg 2008).

The fabric can consist of multiple different fibers; therefore, they can be mixed fabrics.

Suitable precursors for organically modified ceramic materials are hydrolyzable metal organic compounds, in particular of silicon and aluminum.

Additional examples of the additives mentioned above as well as examples of suitable UV-absorbers, radical scavengers, spreading agents, flame retardants, siccatives, drying agents, skin-preventing agents, corrosion inhibitors and waxes are described in detail in the textbook "Lackadditive" of Johan Bielemann, Wiley-VCH, Weinheim, New York, 1998.

Further examples of additives are dyes, colored pigments, white pigments, fluorescent pigments and phosphorescent pigments (phosphors) as well as the materials hereinafter described.

Carbohydrates:

Glyceric aldehyde, erythrose, threose, ribose, arabinose, xylose, lyxose, fructose, allose, altrose, glucose, mannose, idose, galactose talose, rhamnose, amino sugars like neuramic acid, muraminic acid, glucosamine and mannosamine, aldonic acids, ketoaldonic acids, aldaric acids, pyranose, saccharose, lactose, raffinose, panose as well as homopolysaccharides and heteropolysaccharides und proteoglycanes, wherein polysaccharide proportion outweighs the protein proportion like starch, dextran, cyclodextrine, arabinogalactane, celluloses, modified celluloses, lignocelluloses, chitin, chitosan, carageene and glycosaminoglycane.

Monoalcohols:

Methanol, ethanol, propanol, isopropanol, butanol, isobutanol, tert.-butanol, amylalcohol isoamylalcohol, cyclopentanol, hexanol, cyclohexanol, heptanol, octanol, nonanol, decanol, undecanol, dodecanol their stereoisomers.

Polyols:

Glycerol, trimethylolpropane, pentaerythritol, alditols, cyclitols, dimers and oligomers of glycerol, trimethylolpropane, pentaerythritol, alditols and cyclitols; in particular, tetritols, pentitols, hexitols, heptitols and octitols; in particular arabinitol, ribitol, xylitol, erythritol, threitol, galactitol, mannitol, glucitol, allitol, altritol, iditol, maltitol, isomaltitol, lactitol, tri-, tetra-, penta-, hexa-, hepta-, octa-, nona-, deca-, undeca- und dodecaglycerol, -trimethylolpropan, -erythritol, -threitol and -pentaerythritol, 1,2,3,4-tetrahydroxycyclohexane, 1,2,3,4,5-pentahydroxycyclohexane, myo-, scyllo-, muco-, chiro-, neo-, allo-, epi- und cis-Inositol.

Polyhydroxycarboxylic Acids:

Glyceric-, citric, tartaric, threonic, erythronic, xylonic-, ascorbinic, gluconic, galacturonic, iduronic, mannuronic, glucuronic, guluronic, glycuronic, glucaric, ulusonic, diketogulonic and lactobionic acid.

Polyhydroxyrthenols and Polyhydroxycarbonic:

Pyrocatechol, resorcinol, hydroquinone, pyrogallol, 1,2, 4-trishydroxybenzene, phloroglucine, 2,3-, 2,4-, 2,5-, 2,6-, 3,4- and 3,5-dihydroxybenzoic- and 2,4,6-, 2,4,5-, 2,3,4- and 3,4,5-trihydroxybenzenic acid (bile acid).

Amines:

Ammonia, ammonium, mono-, di- und trialkyl-, -aryl-, cycloalkyl-, -alkylaryl-, -alkylcycloakyl-, -cycloalkylaryl- and -alkylcycloalkylarylamine, such as methylamine, ethylamine, propylamine, isopropylamine, butylamine, isobutylamine, tert.-butylamine, benzylamine, cyclohexylamine, dodecylamine, cocoa amine, talc amine, adamantylamine, aniline, ethylendiamine, propylendiamine, butylendiamine, piperidine, piperazine, pyrazolidine, pyrazine, quinuclidine und morpholine.

Thiols:

Mercaptopropionic acid, dimercaptosuccinic acid (DMSA), dithiothreitol (DTT) and octadecanethiol.

Click-Chemistry:

Compounds for click-reactions, such as the copper catalyzed cycloaddition of azides and alkines, Diels-Alder reactions, reactions, for example, of folic acid with alkine groups and dipolar cycloadditions, for example, with poly(tert.-butylacrylate).

Fatty Acids:

Laurinic-, myristinic, oleic-, palmitinic, linolic, stearinic, arachinic and behenic acid.

Polymers and Oligomers with Functional Groups:

Poly(trimethylammonium-ethylacrlylate), polyacrylamide, poly(D,L-lactide-co-ethyleneglykol), Pluronic®, Tetronic®, polyvinylalcohol (PVA), polyvinylpyrrolidone (PVP), poly(alkylcyano acrylate), poly(lactic acid), poly(epsilon-caprolacton), polyethylenglykol (PEG), poly(oxyethylene-co-propene)bisphosphonate, poly(acrylic acid), poly(methacrylic acid), hyaluronic acid, algininic acid, pectinic acid, poly(ethyleneimine), poly(vinylpyridine), polyisobutene, poly(styrenesulfonic acid), poly(glycidylmethacrylate), poly(methacryloyloxyethyl-trimethylammoniumchloride) (MATAC), poly(L-lysine) und poly(3-(trimethoxysilyl)propylmethacrylate-r-PEG-methylethermethacrylat), proteins, such as treptavidin, trypsin, albumin, immunoglobulins, oligo- and polynucleotides, such as DNA and RNA, peptides like arginylglycylaspargic acid (RGD), AGKGTPSLETTP-peptide (A54), HSYHSHSLLRMF-peptide (C10) and gluthathione, enzymes like glucoseoxidase, dendrimers like polypropylenimine-tetrahexacontaamine-dendrimer generation 5 (PPI G5), poly(amidoamine) (PAMAM) and guanidine-dendrimers, phosphonic acid und dithiopyridine functionalized polystyrenes, functionalized polyethylenglykols (PEG: degree of polymerization 4-10, in particular, 5) like PEG(5)-nitro DOPA, nitrodopamine, mimosine, hydroxydopamine, hydroxypyridine, hydroxypyrone and carboxyl.

Chelating Agents:

Complexones like nitrilotriacetic acid (NTA) and ethylenediaminetetraacetic acid (EDTA), phosphonic acids like [(2-aminoethyl)hydroxymethylene]- and [(5-aminopentyl) hyroxymethylenediphosphonic acid, and crown ethers.

Metal Complexes:

Customary and known coordination, sandwich und chelate complexes of metals and their cations with organic and inorganic anions, in particular, fluoride, chloride, bromide, iodide, cyanide, cyanate, isocyanate, sulfide, thiocyanate and/or isothiocyanate, and/or molecules like ammonia, amines, phosphines, thiols, boranes, carbon monoxide, aromatic oder heteroaromatic compounds.

Sands:

River sand, sea sand, desert sand, beach and fossilized minable sand.

Moreover, the polymers wastes can contain diamagnetic micro- and nanoparticles, such as oxides from the group consisting of scandium oxide, yttrium oxide, titanium dioxide, zirconium dioxide, yttrium-stabilized zirconium dioxide, hafnium dioxide, vanadium oxide, niobium oxide, tantalum oxide, manganese oxide, iron oxide, chromium oxide, molybdenum oxide, tungsten oxide, zinc oxide, oxides of the lanthanides, preferably, lanthanium oxide und cerium oxide, in particular cerium oxide, oxides of the actinides, magnesium oxide, calcium oxide, strontium oxide, barium oxide, aluminium oxide, zinc-doped aluminium oxide, gallium oxide, indium oxide, silicon dioxide, germanium oxide, tin oxide, antimony oxide, bismuth oxide, zeolites, spinels, mixed oxides of at least two of the mentioned oxides like antimony-tin oxide, indium-tin oxide, bariumtitanate, leadtitanate oder lead-zirkonate-titanate;

phosphates wie hydroxylapatite or calciumphosphate;

sulfides, selenides and tellurides of the group consisting of arsenic, antimony, bismuth, cadmium, zinc, iron, silver, lead and copper sulfide, cadmium selenide, tin selenide, zinc selenide, cadmium telluride and lead telluride;

selenium and selenium dioxide (cf. Shakibaie et al, »Anti-Biofilm Activity of Biogenic Selenium Nanoparticles and Selenium Dioxide against Clinical Isolates of Staphylococcus Aureus, Pseudomonas Aeruguinosa, and Proteus Mirabilis«, Journal of Trace Elements in him Medicine and Biology, Vol. 29, January 2015, pages 235 to 241);

nitrides like boron nitride, silicon nitride, aluminium nitride, gallium nitride und titanium nitride;

phosphides, arsenides und antimonides of the group consisting of aluminium phosphide, gallium phosphide, indium phosphide, aluminium arsenide, gallium arsenide, indium arsenide, aluminum antimonide, gallium antimonide and indium antimonide;

Carbons like fullerenes, graphene, graphene oxide, functionalized graphene, in particular, functionalized with hydroxyl groups, carbonyl groups, amino groups and epoxy groups, functionalized graphite, graphite oxide, graphite intercalation compounds, diamond and functionalized and non-functionalized carbon nanotubes;

nanocellulose particles, like cellulose nanofibers (CNF), cellulose microfibrils (MFC), nanocrystalline celluloses (CNC), microcrystalline cellulose (MCC) and bacterial nanocellulose (BNC), ausgewählt;

metal organic frameworks (MOFs);

carbides like boron carbide, silicon carbide, tungsten carbide, titanium carbide or cadmium carbide;

borides like zirkonium boride; and silicides like molybdenum silicide.

Furthermore, the polymer wastes can contain magnetic and/or magnetizable nanoparticles and/or microparticles, such as iron, cobalt, nickel and alloys of iron with at least one metal selected from the group consisting of ruthenium, osmium, cobalt, rhodium, iridium, nickel, palladium, platinum, copper, silver, gold, zinc, cadmium scandium, yttrium, lanthanum, cerium, praseodym, neodym, samarium, europium, gadolinium terbiumoxid, dysprosium, holmium, erbium, thulium, ytterbium, lutetium, titan, zirkonium, hafnium, vanadium, niobium, tantalum, chromium, molybdenum, tungsten, manganese, rhenium, aluminum, gallium, indium, thallium, germanium, tin, lead, antimony and bismuth; examples of suitable metal alloys are magnetically soft metal alloys like Permalloy® on the basis of nickel and iron, nickel-iron-zinc alloys oder Sendust on the basis of aluminum, silicon and iron; $RE_{1-y}Fe_{100-v-w-x-z}Co_wM_zB_x$, wherein RE designates a rare earth metal from the group of cerium, praseodym, neodym, samarium, europium, gadolinium, terbium, dysprosium, holmium, erbium, thulium, ytterbium and lutetium and M designates a metal from the group of titanium, zirkonium, hafnium, vanadium, niobium, tantalum, chromium, molybdenum and tungsten and $v=5-15$, $w \geq 5$, $x=9-30$, $y=0.05-0.5$ and $z=0.1-5$; the aforementioned metals and metal alloys can contain at least one additional metal and/or non-metal, which is or are selected from the group consisting of lithium, sodium, potassium, rubidium, cesium, beryllium, magnesium, calcium, strontium, barium, boron, carbon, silicon, nitrogen, phosphorus, arsenic, oxygen, sulfur, selenium, tellurium, fluorine, chlorine, bromine and iodine in non-stoichiometric amounts. A particularly useful material of this kind is NdFeB; and metal oxides, garnets, spinels and ferrites; examples of particularly useful materials of this kind are $Fe_3O_4$, $CoFe_2O_4$, $NiFe_2O_4$, $MnFe_2O_4$, $SrFe_2O_4$, $BaFe_2O_4$, $CuFe_2O_4$, $Y_3Fe_5O_{12}$, $CrO_2$, $MnO$, $Mn_3O_4$, $Mn_2O$, $FeO$, $Fe_2O_3$, $NiO$, $Cr_2O_3$, $CoO$, $Co_3O_4$, $BaFe_{12}O_{19}$, $(Bi,La,Tb)(Fe,Mn,DyPr)O_3$, $Ba_3Co_2Fe_{24}O_{41}$, $Y_3Fe_5O_{12}$, $NiZnFe_2O_4$, $Cu_{0.2}Mg_{0.4}Zn_{0.4}Fe_2O_4$, $Fe_3O_4(Cu,Ni,Zn)Fe_2O_4$, $TbMn_2O_5$, $PbNi_{1/3}Nb_{2/3}TiO_3$—$CuNiZn$, $BaTiO_3$—$NiZnFe_2O_4$, doped $BaTiO_3$, doped $SrTiO_3$, $(Ba,Sr)TiO_3$, $Pb(Zr,Ti)O_3$, $SrBi_2Ta_2O_9$, $PbN_{1/3}Nb_{2/3}TiO_3$—$PbTio_3$, $PbMg_{1/3}Nb_{2/3}TiO_3$—$PbTiO_3$, lanthanum-modified and lanthanum-strontium modified $Pb(Zr,Ti)O_3$, $Pb(Zr_xTi_{1-x})O_3$, wherein x is greater than or equal to 1, $PbHfO_3$, $PbZrO_3$, $Pb(Zr,Ti)O_3$, $PbLa(Zr,Sn,Ti)O_3$, $PbNb(ZrSnTi)O_3$, $Pb_{1-x}La_x(Zr_yTi_{1-y})_{(1-x)/4}O_3$, wherein x is greater than or equal to 1 and y is greater than or equal to 1, $NaNbO_3$, $(K,Na)(Nb,Ta)O_3$, $KNbO_3$, $BaZOr_3$, $Na_{0.25}K_{0.25}Bi_{0.5}TiO_3$, $Ag(Ta,Nb)O_3$ or $Na_{0.5}Bi_{0.5}TiO_3$—$K_{0.5}Bi_{0.5}TiO_3$—$BaTiO_3$.

The wastes can also derive from plastic laminates, which are built up from at least two different plastics.

The wastes can also derive from plastic laminates which contain at least one layer which is not formed from plastics. Examples for such materials from which such layers can be formed are wood, hardboard, glass, textile, and/or metals like chromium, iron, copper, silver, gold or aluminum and their alloys.

The wastes of the plastic laminates can furthermore contain adhesives or adhesive layers, as for example, chemically hardening adhesives, polymerization adhesives, cyanoacrylate adhesives (instant adhesives), methyl methacrylate adhesives, anaerobic hardening adhesives, unsaturated polyesters (UP resins), radiation curable adhesives, polycondensation adhesives, phenol-formaldehyde adhesives, silicones, silane cross-linking adhesives, polymeric adhesives, polyimide adhesives, polyisocyanate adhesives, physically binding adhesives, solvent containing wet adhesives, contact adhesives, dispersion adhesives, plastisols, adhesives without a solidification mechanism and pressure-sensitive adhesives.

The aforementioned wastes can also be wastes of products of less value which have been prepared from plastics and plastic laminates.

Moreover, the wastes change their structure and the properties by weathering, hydrolysis, oxidation, reduction, thermal stress, stress by actinic radiation which means IR-radiation, visible light and UV-radiation.

Last but not least, the plastics and the plastic laminates are unavoidably contaminated after prolonged outdoor use and storage with ubiquitous persistent organic pollutants or long-lasting organic pollutants or POP, such as chloroorganic insecticides of the first generation as for example chlordane, DDT, dieldrin or toxaphen, industrially produced chemicals like PCB or side products of syntheses and combustion products like chlorinated of brominated dioxins or dibenzofurans build up unavoidably during the long-lasting outdoor use of the plastics and laminates. Representatives of these classes of compounds are also designated as "The Dirty Dozen". The POP are semivolatile and can occur in the gas phase as well as bound to dust particles and are distributed worldwide by long-range transport mechanisms. Due to their lipophilicity, bioaccumulation in the fatty tissue of animals and of humans occurs. Some of the POP are said to be endocrinal disruptors or carcinogenic and are also associated with infertility, behavioral disorders and immunodeficiency.

As the plastic wastes and laminate wastes are polluted with the ubiquitous occurring persistent organic contaminants (POPs) during a long-term wild dumping in the environment, during a long retention time in the seawater or during their long-term storage in a controlled landfill, they must be taken necessarily into account in the process of recycling of the plastic wastes so that the resulting valuable products are free from POPs and other organic halogen containing compounds. Well-known examples for such organic halogen containing compounds are perfluorooctaneic acid, brominated flame retardants like diphenylethers, dichloroethanes, trichloroethanes and tetrachloroethanes, hexachlorobutadiene, hexachlorocyclohexane or chloroparaffins, which among others can function as sources for dioxins and dibenzofurans.

It is a particular advantage of the process of the invention that these halogen compounds are eliminated during the preparation of the valuable products.

Moreover, a lot of other substances can adhere to the wastes described hereinbefore, such as minerals, sands, soils, petroleum, oils, fats, waxes, pitch, animals like mussels, plants, algae, foodstuffs (spoiled or non-spoiled), faeces, diapers, hairs, paper residues, corroded metal residues, glass residues, color residues, coatings, residues, and the like. It is a most particular advantage of the mechanochemical process of the invention that these contaminants must not necessarily be separated from the plastic wastes and plastic laminate wastes. Thus, they can be processed with the mechanochemical process of the invention and can be co-milled in order to be converted to valuable products together with the plastic wastes and plastic laminate wastes. This has the advantage that, with regard to the particles, the same conditions exist everywhere during the milling process of the invention so that uniform valuable products result. Preferably, the average particle size determined by sieve analysis is between 2 mm to 1 μm, more preferably 1 mm to 1 μm and most preferably 900 μm to 1 μm. Preferably, this process step is carried out with cutting mills, shredders, impact mills, spiral jet mills, fluidized bed-counter jet mills, bexmills, primary crushers, hammer mills or micro-pulverizers.

The milling step, which is crucial for the invention can be carried out preferably in a ball mill, a drum mill, a vibration mill, a planetary mill, a shearer, a squeezer, a mortar and/or rubbing system. The crucial milling step can be carried out in a cascade of mills connected in series so that the wastes are optimally shredded and can be converted to uniform valuable products. However, it is also possible to use only one mill which is optimized for the given particular case. The average particle size of the resulting valuable products can vary broadly and can be adjusted by the process conditions. Preferably, the average particle size is less than 1000 nm to 1 nm, more preferably, 650 nm±200 nm.

Suitable spherical grinding or milling media consist of, for example, zirconium dioxide (yttrium-stabilized), zirconium dioxide (cerium-stabilized), mixed zirconium oxide, zirconium silicate, aluminum oxide, steatite, diamond pearls, glass, carbon steel, chromium steel, nirosta steel, zirconium silicate/zirconium oxide/silicon nitride, boron carbide, silicon carbide or tungsten carbide. The skilled artisan can select the suitable grinding media specifically for each particular case on the basis of its general knowledge.

Moreover, the process can be controlled by the following parameters: the impact, the grinding time, the size of the balls, the temperature ranges (freezing range: less than 0° C.; room temperature=23° C., warmth: 20° C. to 100° C.; heat: more than 100° C.), pressure ranges like negative pressure, standard pressure, and overpressure, the presence of inert gases, such as rare gases, nitrogen or carbon dioxide, the presence of liquid gases like nitrogen or liquid carbon dioxide, the presence of frozen liquids like carbon dioxide or ice and/or the presence of liquids like water.

Furthermore, process can be controlled by the use of external cooling or heating devices. Thus, also, the temperature can be specifically adjusted in the temperature range between nitrogen and ice, as for example, by solid or liquid methyl cyclohexane (melting point: −126° C.).

By way of cooling under or far under the glass transition temperature of the plastics to be ground, the latter become brittle and, therefore, are particularly well milled without smearing. This way, the grinding process is accelerated.

In an advantageous embodiment of the mechanochemical process of the invention, the mills or the content can be irradiated with ultrasound, audible sound and/or actinic radiation, in particular microwave radiation, IR-radiation, visible light, UV-radiation, soft x-rays and electron radiation. This way, additional reactive radicals are produced on the particles to be ground which open up new reaction paths.

Moreover, it is essential for the process of the invention, that the wastes are milled in the presence of a dehalogenation agent. The amount of the dehalogenation agent used conforms in first place with the amount of the halogens contained in the wastes. Anyway, at least so much of the dehalogenation agent has to be added that the persistent organic contaminants and the other organic halogen compounds are eliminated.

Several possible methods are available for the dehalogenation.

The Reductive Dehalogenation:

As reductive dehalogenation agents, reducing agents, such as alkali metals like lithium, sodium, rubidium and cesium, earth alkali metals like magnesium, calcium and strontium, solutions of alkali metals and earth alkali metals in liquid ammonia and liquid amines, as well as in other water-like solvents, Zintl phases like $Na_4Sn_9$, $Na_4Pb_9$, $Na_2Pb_{10}$, $Na_3[Cu@Sn_9]$, $Na_7[Ge_9CuGe_9]$ or $Na_{12}[Sn_2@Cu_{12}Sn_{20}]$, graphite intercalation compounds of alkali metals like $C_8K$, hydrides such as salt-like hydrides like calcium hydride, sodium hydride, complex hydrides like lithium aluminum hydride, sodium boronhydride or SUPER-HYDRID™ ($Li[B(C_2H_5)_3H]$), complex transition metal hydrides or metal hydrides like zirconium hydride or metals like aluminum, iron, zinc, lanthanum, the lanthanides and the actinides.

Preferably, a hydrogen source with easily activatable hydrogen can be added to the reducing agents. Examples of suitable hydrogen sources are ethers, polyethers, the above-mentioned metal hydrides, liquid ammonia, trialkyl silanes and/or polyalkylhydrogen siloxanes.

Examples of suitable ethers are simple symmetrical or asymmetrical aliphatic ethers or polyethers, as for example, diethyl ether, dipropyl ether, diisopropyl ether, di-n-butyl ether, dimeric or trimeric polyethers, crown ethers and cryptants or spherants for host-guest molecules.

Examples of suitable amines are aliphatic amines like lower primary, secondary or tertiary aliphatic amines, as for example, primary, secondary or tertiary aliphatic or alicyclic monoamines or polyamines, in particular, methyl amine, ethyl amine, 1- and 2-propyl amine, 1- and 2-butyl amine, ethylenediamine, tri-, tetra-, penta- or hexamethylenediamine, diethyl amine, di-n-propyl amine, cyclopropyl and cyclohexyl amine, nitrogen heterocycles and perhydro nitrogen heterocycles, as for example, piperidine, 1-(2-aminoethyl)-piperazine, 1-(2-aminoethyl)-pyrrolidine, 1-(2-aminoethyl)-piperidine or 4-(2-aminoethyl)-morpholine.

Examples of suitable amides as alternatives to the amines are 1,3-dimethyl-3,4,5,6-tetrahydroxy-2(H)-pyrimidinone (dimethyl propylene urea, DMPU), 1,3-dimethyl-2-imidazolidone (N,N-dimethyl ethylene, urea, DMEU), 1-methyl-2-pyrrolidone (NMP), N,N-dimethylacetamide, N,N-diethylpropioamide, and N,N-diethylisobutyramide.

In the mechanochemical process of the invention, grinding aids can be used. Preferably, they are materials which can reduce the surface energy and/or the plastic deformation of solids upon the impact of mechanical energy. Examples of suitable materials of this kind are surface active substances in various conditions and preparations, as for example quaternary ammonium compounds, which cannot only be used as pure substances, but also immobilized on surface active carriers like layered silicates or clays (so-called organophilic bentonites), substituted alkyl imidazoles and sulfosuccine amide, fatty acids, fatty acid esters and amides, primary, secondary and tertiary alkylfatty amines, with one or more amino group(s), alicyclic amines, as for example, cyclohexyl amine, polyhydrogenated nitrogen heterocycles, as for example, piperidine, mono-, di- and triethanolamine, glycols, polyalkylene glycols as for example, polyethylene glycols and polypropylene glycols and their mono- or diethers, organosilicon compounds, in particular, silicones, as well as salts which are suitable for special purposes like aluminum chloride.

It is a particular advantage of the reductive dehalogenation that, in the case of metal-plastic laminates and/or plastic wastes contaminated with metals, the metal part can function as the reducing agent.

The metallic reducing agents can be present in the dispersed or suspended state in a preparation, as for example, in a non-oxidizing liquid or in the liquid hydrogen source. Dispersions of metals in white mineral oil, paraffins or polyethers are preferred. Moreover, the metallic reducing agents can be mixed with a solid inert carrier or there can be applied thereto.

The Dehalogenation with Formation of Metal Oxyhalides:

Oxides like antimony oxide, bismuth oxide, lanthanum oxide, yttrium oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide and/or lutetium oxide can be used. With the organically bonded chlorine or bromine, these oxides form the corresponding oxychlorides and oxybromides, which themselves can be regarded as valuable products or they can be incorporated into the valuable products as fillers.

The Dehalogenation with Formation of Metal Halides:

Metal hydroxides like lithium, sodium, potassium, rubidium, cesium, magnesium, calcium, strontium, barium, zinc, lead, nickel, cobalt, copper and tin hydroxide as well as the iron hydroxides can be used as the dehalogenation agents. With the organically bonded chlorine or bromine, the hydroxides form the corresponding chlorides or bromides and which themselves can be regarded as valuable products or which can be incorporated into the valuable products as fillers.

The Dehalogenation by Carbonates:

Examples of suitable carbonates are carbonates of metals, the chlorides and bromides of which are easily water-soluble. Examples of particularly suitable carbonates are minerals like magnesite, strontianite, witherite, dolomite, aragonite, calcite, vaterite, zinc spar, gaylussite, nitrite soda, trona, mussel chalk and coral chalk as well as synthetic lithium carbonate, sodium hydrogen carbonate, potassium carbonate, magnesium carbonate, calcium carbonate, strontium carbonate and barium carbonate.

The Oxidative Dehalogenation:

Rhenium-catalyzed oxidative dehalogenation with hydrogen peroxide, enzymatic dehalogenation with oxidases/hydrogen peroxide, dehalogenases and peroxidases like homogenized radish, radish juice from raphanus sativus with hydrogen peroxide, advanced oxidation processes (AOP, activated oxidation processes) with the use of UV radiation, hydrogen peroxide and/or the catalytic wet oxidation by the formation of hydroxyl radicals can be used for the oxidative dehalogenation.

Enzymatic Dehalogenation:

Alkylhalidases, (S)-2-halogen carboxylic acid dehalogenases, haloacetate dehalogenases, haloalkane dehalogenases, 4-chlorobenzoate dehalogenases, atrazine chlorohydrolases, 4-chlorobenzoyl coenzyme, A-dehalogenases, (R)-2-halogen carboxylic acid dehalogenases, 2-halogen carboxylic acid dehalogenases (configuration inverting) and 2-halogen carboxylic acid dehalogenases (configuration retaining) can be used for the enzymatic dehalogenation.

With the mechanochemical process of the invention, at least 99.5%, preferably, at least 99.6%, more preferably, at least 99.7% and, in particular, at least 99.8% of the initial quantity of the respective the POPs and, where applicable, of the organic halogen compounds present are eliminated. In particular, they are removed to the greatest possible extent so that their content in the valuable products is below the respective limits of detection of customary and known analytical procedures. In this sense, the valuable products are free from persistent organic contaminants and other organic halogen compounds.

Before the milling, at least one functional additive can be added to the mixture of wastes and dehalogenation agents.

Examples of suitable functional additives are activated carbons and charcoals, like biochar, pyrogenous carbon, plant char, wood char, active chars, mineral coals, animal charcoals, animal waste coals, pyrolyzed carbon with different degrees of pyrolysis, functionalized coals, pretreated coals, washed coals and extracted coals. In particular, biochar and/or pyrogenous carbon is used. These materials are customary and known and are disclosed, for example, by the German laid-open patent application DE 10 2015 010 041 A1, paragraphs [0055] to [0064].

The active chars or the biochars can be prepared in situ during the milling from organic, municipal waste, organic industrial waste and waste from agriculture, forestry and horticulture as well as from lignin containing materials, as for example, green wastes, mulch material wastes of wood and wastes from biogas plants, which can be dried and/or filtered, and spelt.

It is another particular advantage of the mechanochemical process of the invention that the wooden parts of wood- and cardboard-plastic laminates likewise undergo charring.

The active chars and the coals can bind heavy metals, toxic and non-toxic gases, as well as halogens and hydrogen halides as charge-transfer complexes and they can function as catalysts, as crystal nuclei and for the formation of mesoporous or nanoporous materials.

As another additive, acidic, basic on neutral water can be added as a reaction partner in order to accelerate the reactions during milling.

Other suitable additives are materials which form co-crystals, which accelerate the reactions during the milling and/or improve the properties of the materials by generating radicals at the edges and the tips and other exposed locations of the additives, which radicals react with the plastic wastes and with the emerging mesoporous or nanoporous materials and enter into bonds by radical initiation.

Examples of suitable additives of this kind are the aforementioned nanoparticles and nanofibers.

Further suitable additives are the functional additives hereinbefore described as they are customarily used in plastics.

Additional examples of suitable additives are in particular layered silicates which are present as nanoparticles and/or microparticles of an average particle size $d_{50}$ of 1 nm to less than 1000 µm, preferably 10 nm to 900 µm, more preferably, 300 nm to 1000 nm, even more preferably 650 nm±200 nm, particularly preferably, 650 nm±150 nm and most preferably 650 nm±100 nm.

The elemental composition and structure of the layered silicate microparticles and/or nanoparticles can vary very broadly. It is known to organize the silicates according to the following structures:

island silicates,
group silicates,
ring silicates,
belt and chain silicates,
transitional structures between chain and layered silicates,
layered silicates and
framework silicates.

The layered silicates are silicates, wherein the silicate ions consist of corner connected $SiO_4$-tetrahedrons. These layers and/or double layers are not connected with each other. The clay minerals which are technically important and widespread in sedimentary rocks are likewise layered silicates. The layered structure of these minerals determines the form and the properties of the crystals. They are mostly tabular or flaky with good to perfect fissility parallel to the layers. The multiplicity of the rings the silicate layers are composed of often determines the symmetry and the form of the crystals. Water molecules, larger cations and/or lipids can intercalate between the layers.

Examples of suitable layered silicates can be gleaned from the following TABLE 1. The listing is given only by way of example and is not final.

TABLE 1

Moleculare Formulas of Phyllosilicates [a]

| No. | Type | Molecular formular |
|---|---|---|
| 1 | Martinite | $(Na, Ca)_{11}Ca_4(Si, S, B)_{14}B_2O_{40}F_2 \cdot 4(H_2O)$ |
| 2 | Apophyllite-(NaF) | $NaCa_4Si_8O_{20}F \cdot 8H_2O$ |
| 3 | Apophyllite-(KF) | $(K, Na)Ca_4Si_8O_{20}(F, OH) \cdot 8H_2O$ |
| 4 | Apophyllite-(KOH) | $KCa_4Si_8O_{20}(OH, F) \cdot 8H_2O$ |
| 5 | Cuprorivaite | $CaCuSi_4O_{10}$ |
| 6 | Wesselsite | $(Sr, Ba)Cu[Si_4O_{10}]$ |
| 7 | Effenbergerite | $BaCu[Si_4O_{10}]$ |
| 8 | Gillespite | $BaFe^{2+}Si_4O_{10}$ |
| 9 | Sanbornite | $BaSi_2O_5$ |
| 10 | Bigcreekite | $BaSi_2O_5 \cdot 4H_2O$ |
| 11 | Davanite | $K_2TiSi_6O_{15}$ |
| 12 | Dalyite | $K_2ZrSi_6O_{15}$ |
| 13 | Fenaksite | $KNaFe^{2+}Si_4O_{10}$ |
| 14 | Manaksite | $KNaMn^{2+}[Si_4O_{10}]$ |
| 15 | Ershovite | $K_3Na_4(Fe, Mn, Ti)_2[Si_8O_{20}(OH)_4] \cdot 4H_2O$ |
| 16 | Paraershovite | $Na_3K_3Fe^{3+}{}_2Si_8O_{20}(OH)_4 \cdot 4H_2O$ |
| 17 | Natrosilite | $Na_2Si_2O_5$ |
| 18 | Kanemite | $NaSi_2O_5 \cdot 3H_2O$ |
| 19 | Revdite | $Na_{16}Si_{16}O_{27}(OH)_{26} \cdot 28H_2O$ |
| 20 | Latiumite | $(Ca, K)_4(Si, Al)_5O_{11}(SO_4, CO_3)$ |
| 21 | Tuscanite | $K(Ca, Na)_6(Si, Al)_{10}O_{22}(SO_4, CO_3, (OH)_2) \cdot H_2O$ |
| 22 | Carletonite | $KNa_4Ca_4Si_8O_{18}(CO_3)_4(OH, F) \cdot H_2O$ |
| 23 | Pyrophyllite | $Al_2Si_4O_{10}(OH)_2$ |
| 24 | Ferripyrophyllite | $Fe^{3+}Si_2O_5(OH)$ |
| 25 | Macaulayite | $(Fe^{3+}, Al)_{24}Si_4O_{43}(OH)_2$ |
| 26 | Talc | $Mg_3Si_4O_{10}(OH)_2$ |
| 27 | Minnesotaite | $Fe^{2+}{}_3Si_4O_{10}(OH)_2$ |
| 28 | Willemseite | $(Ni, Mg)_3Si_4O_{10}(OH)_2$ |
| 29 | Pimelite | $Ni_3Si_4O_{10}(OH)_2 \cdot 4H_2O$ |
| 30 | Kegelite | $Pb_4Al_2Si_4O_{10}(SO_4)(CO_3)_2(OH)_4$ |
| 31 | Aluminoseladonite | $K(Mg, Fe^{2+})Al[(OH)_2|Si_4O_{10}]$ |
| 32 | Ferroaluminoseladonite | $K(Fe^{2+}, Mg)(Al, Fe^{3+})[(OH)_2|Si_4O_{10}]$ |
| 33 | Seladonite | $K(Mg, Fe^{2+})(Fe^{3+}, Al)Si_4O_{10}(OH)_2$ |
| 34 | Chromseladonite | $KMgCr[(OH)_2|Si_4O_{10}]$ |
| 35 | Ferroseladonite | $K(Fe^{2+}, Mg)(Fe^{3+}, Al)[(OH)_2|Si_4O_{10}]$ |
| 36 | Paragonite | $NaAl_2(Si_3Al)O_{10}(OH)_2$ |
| 37 | Boromuskovite | $KAl_2(Si_3B)O_{10}(OH, F)_2$ |
| 38 | Muskovite | $KAl_2(Si_3Al)O_{10}(OH, F)_2$ |
| 39 | Chromphyllite | $K(Cr, Al)_2[(OH, F)_2|AlSi_3O_{10}]$ |
| 40 | Roscoelithe | $K(V, Al, Mg)_2AlSi_3O_{10}(OH)_2$ |
| 41 | Ganterite | $(Ba, Na, K)(Al, Mg)_2[(OH, F)_2|(Al, Si)Si_2O_{10}]$ |
| 42 | Tobelithe | $(NH_4, K)Al_2(Si_3Al)O_{10}(OH)_2$ |
| 43 | Nanpingite | $CsAl_2(Si, Al)_4O_{10}(OH, F)_2$ |
| 44 | Polylithiontie | $KLi_2AlSi_4O_{10}(F, OH)_2$ |
| 45 | Tainiolithe | $KLiMg_2Si_4O_{10}F_2$ |
| 46 | Norrishite | $KLiMn^{3+}{}_2Si_4O_{12}$ |
| 47 | Shirokshinite | $KNaMg_2[F_2|Si_4O_{10}]$ |
| 48 | Montdorite | $KMn_{0.5}{}^{2+}Fe_{1.5}{}^{2+}Mg_{0.5}[F_2|Si_4O_{10}]$ |
| 49 | Trilithionite | $KLi_{1.5}Al_{1.5}[F_2|AlSi_3O_{10}]$ |
| 50 | Masutomilithe | $K(Li, Al, Mn^{2+})_3(Si, Al)_4O_{10}(F, OH)_2$ |
| 51 | Aspidolithe-1M | $NaMg_3(AlSi_3)O_{10}(OH)_2$ |
| 52 | Fluorophlogopite | $KMg_3(AlSi_3)O_{10}F_2$ |
| 53 | Phlogopite | $KMg_3(Si_3Al)O_{10}(F, OH)_2$ |
| 54 | Tetraferriphlogopite | $KMg_3[(F, OH)_2|(Al, Fe^{3+})Si_3O_{10}]$ |
| 55 | Hendricksite | $K(Zn, Mn)_3Si_3AlO_{10}(OH)_2$ |
| 56 | Shirozulithe | $K(Mn^{2+}, Mg)_3[(OH)_2|AlSi_3O_{10}]$ |
| 57 | Fluorannit | $KFe_3{}^{2+}[(F, OH)_2|AlSi_3O_{10}]$ |
| 58 | Annite | $KFe^{2+}{}_3(Si_3Al)O_{10}(OH, F)_2$ |
| 59 | Tetraferriannite | $KFe^{2+}{}_3(Si_3Fe^{3+})O_{10}(OH)_2$ |
| 60 | Ephesite | $NaLiAl_2(Al_2Si_2)O_{10}(OH)_2$ |
| 61 | Preiswerkite | $NaMg_2Al_3Si_2O_{10}(OH)_2$ |
| 62 | Eastonite | $KMg_2Al[(OH)_2|Al_2Si_2O_{10}]$ |
| 63 | Siderophyllite | $KFe_2{}^{2+}Al(Al_2Si_2)O_{10}(F, OH)_2$ |
| 64 | Anandite | $(Ba, K)(Fe^{2+}, Mg)_3(Si, Al, Fe)_4O_{10}(S, OH)_2$ |
| 65 | Bityite | $CaLiAl_2(AlBeSi_2)O_{10}(OH)_2$ |
| 66 | Oxykinoshitalithe | $(Ba, K)(Mg, Fe^{2+}, Ti^{4+})_3(Si, Al)_4O_{10}O_2$ |
| 67 | Kinoshitalithe | $(Ba, K)(Mg, Mn, Al)_3Si_2Al_2O_{10}(OH)_2$ |
| 68 | Ferrokinoshitalithe | $Ba(Fe^{2+}, Mg)_3[(OH, F)_2|Al_2Si_2O_{10}]$ |
| 69 | Margarite | $CaAl_2(Al_2Si_2)O_{10}(OH)_2$ |
| 70 | Chernykhite | $BaV_2(Si_2Al_2)O_{10}(OH)_2$ |
| 71 | Clintonite | $Ca(Mg, Al)_3(Al_3Si)O_{10}(OH)_2$ |
| 72 | Wonesite | $(Na, K,)(Mg, Fe, Al)_6(Si, Al)_8O_{20}(OH, F)_4$ |
| 73 | Brammallite | $(Na, H_3O)(Al, Mg, Fe)_2(Si, Al)_4O_{10}[(OH)_2, H_2O]$ |
| 74 | Illite | $(K, H_3O)Al_2(Si_3Al)O_{10}(H_2O, OH)_2$ |
| 75 | Glaukonite | $(K, Na)(Fe^{3+}, Al, Mg)_2(Si, Al)_4O_{10}(OH)_2$ |
| 76 | Agrellite | $NaCa_2Si_4O_{10}F$ |

TABLE 1-continued

Moleculare Formulas of Phyllosilicates [a]

| No. | Type | Molecular formular |
|---|---|---|
| 77 | Glagolevite | $NaMg_6[(OH, O)_8|AlSi_3O_{10}] \cdot H_2O$ |
| 78 | Erlianite | $Fe^{2+}{}_4Fe^{3+}{}_2Si_6O_{15}(OH)_8$ |
| 79 | Bannisterite | $(Ca, K, Na)(Mn^{2+}, Fe^{2+}, Mg, Zn)_{10}(Si, Al)_{16}O_{38}(OH)_8 \cdot nH_2O$ |
| 80 | Bariumbannisterite | $(K, H_3O)(Ba, Ca)(Mn^{2+}, Fe^{2+}, Mg)_{21}(Si, Al)_{32}O_{80}(O, OH)_{16} \cdot 4\text{-}12 H_2O$ |
| 81 | Lennilenapeite | $K_{6-7}(Mg, Mn, Fe^{2+}, Fe^{3+}, Zn)_{48}(Si, Al)_{72}(O, OH)_{216} \cdot 16H_2O$ |
| 82 | Stilpnomelane | $K(Fe^{2+}, Mg, Fe^{3+}, Al)_8(Si, Al)_{12}(O, OH)_{27} \cdot 2H_2O$ |
| 83 | Franklinphilite | $(K, Na)_{1-x}(Mn^{2+}, Mg, Zn, Fe^{3+})_8(Si, Al)_{12}(O, OH)_{36} \cdot nH_2O$ |
| 84 | Parsettensite | $(K, Na, Ca)_{7.5}(Mn, Mg)_{49}Si_{72}O_{168}(OH)_{50} \cdot nH_2O$ |
| 85 | Middendorfite | $K_3Na_2Mn_5Si_{12}(O, OH)_{36} \cdot 2H_2O$ |
| 86 | Eggletonite | $(Na, K, Ca)_2(Mn, Fe)_8(Si, Al)_{12}O_{29}(OH)_7 \cdot 11H_2O$ |
| 87 | Ganophyllite | $(K, Na)_xMn^{2+}{}_6(Si, Al)_{10}O_{24}(OH)_4 \cdot nH_2O \{x = 1\text{-}2\}\{n = 7\text{-}11\}$ |
| 88 | Tamaite | $(Ca, K, Ba, Na)_{3-4}Mn^{2+}{}_{24}[(OH)_{12}|\{(Si, Al)_4(O, OH)_{10}\}_{10}] \cdot 21H_2O$ |
| 89 | Ekmanite | $(Fe^{2+}, Mg, Mn, Fe^{3+})_3(Si, Al)_4O_{10}(OH)_2 \cdot 2H_2O$ |
| 90 | Lunijianlaite | $Li_{0.7}Al_{6.2}(Si_7AlO_{20})(OH, O)_{10}$ |
| 91 | Saliotite | $Na_{0.5}Li_{0.5}Al_3[(OH)_5|AlSi_3O_{10}]$ |
| 92 | Kulkeite | $Na_{0.35}Mg_8Al(AlSi_7)O_{20}(OH)_{10}$ |
| 93 | Aliettite | $Ca_{0.2}Mg_6(Si, Al)_8O_{20}(OH)_4 \cdot 4H_2O$ |
| 94 | Rectorite | $(Na, Ca)Al_4(Si, Al)_8O_{20}(OH)_4 \cdot 2H_2O$ |
| 95 | Tarasovite | $(Na, K, H_3O, Ca)_2Al_4[(OH)_2|(Si, Al)_4O_{10}]_2 \cdot H_2O$ |
| 96 | Tosudite | $Na_{0.5}(Al, Mg)_6(Si, Al)_8O_{18}(OH)_{12} \cdot 5H_2O$ |
| 97 | Corrensite | $(Ca, Na, K)(Mg, Fe, Al)_9(Si, Al)_8O_{20}(OH)_{10} \cdot nH_2O$ |
| 98 | Brinrobertsite | $(Na, K, Ca)_{0.3}(Al, Fe, Mg)_4(Si, Al)_8O_{20}(OH)_4 \cdot 3.5H_2O$ |
| 99 | Montmorillonite | $(Na, Ca)_{0.3}(Al, Mg)_2Si_4O_{10}(OH)_2 \cdot nH_2O$ |
| 100 | Beidellite | $(Na, Ca_{0.5})_{0.3}Al_2(Si, Al)_4O_{10}(OH)_2 \cdot 4H_2O$ |
| 101 | Nontronite | $Na_{0.3}Fe^{3+}{}_2(Si, Al)_4O_{10}(OH)_2 \cdot 4H_2O$ |
| 102 | Volkonskoite | $Ca_{0.3}(Cr^{3+}, Mg, Fe^{3+})_2(Si, Al)_4O_{10}(OH)_2 \cdot 4H_2O$ |
| 103 | Swinefordite | $(Ca, Na)_{0.3}(Al, Li, Mg)_2(Si, Al)_4O_{10}(OH, F)_2 \cdot 2H_2O$ |
| 104 | Yakhontovite | $(Ca, Na, K)_{0.3}(CuFe^{2+}Mg)_2Si_4O_{10}(OH)_2 \cdot 3H_2O$ |
| 105 | Hectorite | $Na_{0.3}(Mg, Li)_3Si_4O_{10}(F, OH)_2$ |
| 106 | Saponite | $(Ca|_2, Na)_{0.3}(Mg, Fe^{2+})_3(Si, Al)_4O_{10}(OH)_2 \cdot 4H_2O$ |
| 107 | Ferrosaponite | $Ca_{0.3}(Fe^{2+}, Mg, Fe^{3+})_3[(OH)_2|(Si, Al)Si_3O_{10}] \cdot 4H_2O$ |
| 108 | Spadaite | $MgSiO_2(OH)_2 \cdot H_2O$ |
| 109 | Stevensite | $(Ca|_2)_{0.3}Mg_3Si_4O_{10}(OH)_2$ |
| 110 | Sauconite | $Na_{0.3}Zn_3(Si, Al)_4O_{10}(OH)_2 \cdot 4H_2O$ |
| 111 | Zinksilite | $Zn_3Si_4O_{10}(OH)_2 \cdot 4H_2O$ |
| 112 | Vermiculite | $Mg_{0.7}(Mg, Fe, Al)_6(Si, Al)_8O_{20}(OH)_4 \cdot 8H_2O$ |
| 113 | Rilandite | $(Cr^{3+}, Al)_6SiO_{11} \cdot 5H_2O$ |
| 114 | Donbassite | $Al_{2.3}[(OH)_8|AlSi_3O_{10}]$ |
| 115 | Sudoite | $Mg_2Al_3(Si_3Al)O_{10}(OH)_8$ |
| 116 | Klinochlore | $(Mg, Fe^{2+})_5Al(Si_3Al)O_{10}(OH)_8$ |
| 117 | Chamosite | $(Fe^{2+}, Fe^{3+})_5Al(Si_3Al)O_{10}(OH, O)_8$ |
| 118 | Orthochamosite | $(Fe^{2+}, Mg, Fe^{3+})_5Al(Si_3Al)O_{10}(OH, O)_8$ |
| 119 | Baileychlore | $(Zn, Fe^{2+}, Al, Mg)_6(Si, Al)_4O_{10}(OH)_8$ |
| 120 | Pennantite | $Mn^{2+}{}_5Al(Si_3Al)O_{10}(OH)_8$ |
| 121 | Nimite | $(Ni, Mg, Fe^{2+})_5Al(Si_3Al)O_{10}(OH)_8$ |
| 122 | Gonyerite | $Mn^{2+}{}_5Fe^{3+}(Si_3Fe^{3+}O_{10})(OH)_8$ |
| 123 | Cookeite | $LiAl_4(Si_3Al)O_{10}(OH)_8$ |
| 124 | Borocookeite | $Li_{1-1.5}Al_{4-3.5}[(OH, F)_8|(B, Al)Si_3O_{10}]$ |
| 125 | Manandonite | $Li_2Al_4[(Si_2AlB)O_{10}](OH)_8$ |
| 126 | Franklinfurnaceite | $Ca_2(Fe^{3+}Al)Mn^{3+}Mn_3{}^{2+}Zn_2Si_2O_{10}(OH)_8$ |
| 127 | Kämmererite(Var. v. Klinochlore) | $Mg_5(Al, Cr)_2Si_3O_{10}(OH)_8$ |
| 128 | Niksergievite | $(Ba, Ca)_2Al_3[(OH)_6|CO_3|(Si, Al)_4O_{10}] \cdot 0.2\ H_2O$ |
| 129 | Surite | $Pb_2Ca(Al, Mg)_2(Si, Al)_4O_{10}(OH)_2(CO_3, OH)_3 \cdot 0.5\ H_2O$ |
| 130 | Ferrisurite | $(Pb, Ca)_{2-3}(Fe^{3+}, Al)_2[(OH, F)_{2.5-3}|(CO_3)_{1.5-2}|Si_4O_{10}] \cdot 0.5\ H_2O$ |
| 131 | Kaolinite | $Al_2Si_2O_5(OH)_4$ |
| 132 | Dickite | $Al_2Si_2O_5(OH)_4$ |
| 133 | Halloysite-7Å | $Al_2Si_2O_5(OH)_4$ |
| 134 | Sturtite | $Fe^{3+}(Mn^{2+}, Ca, Mg)Si_4O_{10}(OH)_3 \cdot 10\ H_2O$ |
| 135 | Allophane | $Al_2O_3 \cdot (SiO_2)_{1.3-2} \cdot (H_2O)_{2.5-3}$ |
| 136 | Imogolithe | $Al_2SiO_3(OH)_4$ |
| 137 | Odinite | $(Fe^{3+}, Mg, Al, Fe^{2+}, Ti, Mn)_{2.4}(Si_{1.8}Al_{0.2})O_5(OH)_4$ |
| 138 | Hisingerite | $Fe_2{}^{3+}Si_2O_5(OH)_4 \cdot 2H_2O$ |
| 139 | Neotokite | $(Mn, Fe^{2+})SiO_3 \cdot H_2O$ |
| 140 | Chrysotile | $Mg_3Si_2O_5(OH)_4$ |
| 141 | Klinochrysotile | $Mg_3Si_2O_5(OH)_4$ |
| 142 | Maufite | $(Mg, Ni)Al_4Si_3O_{13} \cdot 4H_2O$ |
| 143 | Orthochrysotil | $Mg_3Si_2O_5(OH)_4$ |
| 144 | Parachrysotil | $Mg_3Si_2O_5(OH)_4$ |
| 145 | Antigorite | $(Mg, Fe^{2+})_3Si_2O_5(OH)_4$ |
| 146 | Lizardite | $Mg_3Si_2O_5(OH)_4$ |
| 147 | Karyopilite | $Mn^{2+}{}_3Si_2O_5(OH)_4$ |
| 148 | Greenalithe | $(Fe^{2+}, Fe^{3+})_{2-3}Si_2O_5(OH)_4$ |
| 149 | Berthierine | $(Fe^{2+}, Fe^{3+}, Al)_3(Si, Al)_2O_5(OH)_4$ |
| 150 | Fraipontite | $(Zn, Al)_3(Si, Al)_2O_5(OH)_4$ |

TABLE 1-continued

Moleculare Formulas of Phyllosilicates [a]

| No. | Type | Molecular formular |
|---|---|---|
| 151 | Zinalsite | $Zn_7Al_4(SiO_4)_6(OH)_2 \cdot 9H_2O$ |
| 152 | Dozyite | $Mg_7(Al, Fe^{3+}, Cr)_2[(OH)_{12}|Al_2Si_4O_{15}]$ |
| 153 | Amesite | $Mg_2Al(SiAl)O_5(OH)_4$ |
| 154 | Kellyite | $(Mn^{2+}, Mg, Al)_3(Si, Al)_2O_5(OH)_4$ |
| 155 | Cronstedtite | $Fe_2^{2+}Fe^{3+}(SiFe^{3+})O_5(OH)_4$ |
| 156 | Karpinskite | $(Mg, Ni)_2Si_2O_5(OH)_2$ |
| 157 | Népouite | $(Ni, Mg)_3Si_2O_5(OH)_4$ |
| 158 | Pecoraite | $Ni_3Si_2O_5(OH)_4$ |
| 159 | Brindleyite | $(Ni, Mg, Fe^{2+})_2Al(SiAl)O_5(OH)_4$ |
| 160 | Carlosturanite | $(Mg, Fe^{2+}, Ti)_{21}(Si, Al)_{12}O_{28}(OH)_{34} \cdot H_2O$ |
| 161 | Pyrosmalithe-(Fe) | $(Fe^{2+}, Mn)_8Si_6O_{15}(Cl, OH)_{10}$ |
| 162 | Pyrosmalithe-(Mn) | $(Mn, Fe^{2+})_8Si_6O_{15}(OH, Cl)_{10}$ |
| 163 | Brokenhillite | $(Mn, Fe)_8Si_8O_{15}(OH, Cl)_{10}$ |
| 164 | Nelenite | $(Mn, Fe^{2+})_{16}Si_{12}As^{3+}_3O_{36}(OH)_{17}$ |
| 165 | Schallerite | $(Mn^{2+}, Fe^{2+})_{16}Si_{12}As^{3+}_3O_{36}(OH)_{17}$ |
| 166 | Friedelite | $Mn^{2+}_8Si_6O_{15}(OH, Cl)_{10}$ |
| 167 | Mcgillite | $Mn^{2+}_8Si_6O_{15}(OH)_8Cl_2$ |
| 168 | Bementite | $Mn_7Si_6O_{15}(OH)_8$ |
| 169 | Varennesite | $Na_8(Mn, Fe^{3+}, Ti)_2[(OH, Cl)_2|(Si_2O_5)_5] \cdot 12H_2O$ |
| 170 | Naujakasite | $Na_6(Fe^{2+}, Mn)Al_4Si_8O_{26}$ |
| 171 | Manganonaujakasite | $Na_6(Mn^{2+}, Fe^{2+})Al_4[Si_8O_{26}]$ |
| 172 | Spodiophyllite | $(Na, K)_4(Mg, Fe^{2+})_3(Fe^{3+}, Al)_2(Si_8O_{24})$ |
| 173 | Sazhinit-e(Ce) | $Na_2CeSi_6O_{14}(OH) \cdot nH_2O$ |
| 174 | Sazhinite-(La) | $Na_3La[Si_6O_{15}] \cdot 2H_2O$ |
| 175 | Burckhardtite | $Pb_2(Fe^{3+}Te^{6+})[AlSi_3O_8]O_6$ |
| 176 | Tuperssuatsiaite | $Na_2(Fe^{3+}, Mn^{2+})_3Si_8O_{20}(OH)_2 \cdot 4H_2O$ |
| 177 | Palygorskite | $(Mg, Al)_2Si_4O_{10}(OH) \cdot 4H_2O$ |
| 178 | Yofortierite | $Mn^{2+}_5Si_8O_{20}(OH)_2 \cdot 7H_2O$ |
| 179 | Sepiolithe | $Mg_4Si_6O_{15}(OH)_2 \cdot 6H_2O$ |
| 180 | Falcondoite | $(Ni, Mg)_4Si_6O_{15}(OH)_2 \cdot 6H_2O$ |
| 181 | Loughlinite | $Na_2Mg_3Si_8O_{16} \cdot 8H_2O$ |
| 182 | Kalifersite | $(K, Na)_5Fe_7^{3+}[(OH)_3|Si_{10}O_{25}]_2 \cdot 12H_2O$ |
| 183 | Minehillite | $(K, Na)_{2-3}Ca_{28}(Zn_4Al_4Si_{40})O_{112}(OH)_{16}$ |
| 184 | Truscottite | $(Ca, Mn)_{14}Si_{24}O_{58}(OH)_8 \cdot 2H_2O$ |
| 185 | Orlymanite | $Ca_4Mn_3^{2+}Si_8O_{20}(OH)_6 \cdot 2H_2O$ |
| 186 | Fedorite | $(Na, K)_{2-3}(Ca, Na)_7[Si_4O_8(F, Cl, OH)2|(Si_4O_{10})_3] \cdot 3.5H_2O$ |
| 187 | Reyerite | $(Na, K)_4Ca_{14}Si_{22}Al_2O_{58}(OH)_8 \cdot 6H_2O$ |
| 188 | Gyrolithe | $NaCa_{16}Si_{23}AlO_{60}(OH)_8 \cdot 14H_2O$ |
| 189 | Tungusite | $Ca_{14}Fe_9^{2+}[(OH)_{22}|(Si_4O_{10})_6]$ |
| 190 | Zeophyllite | $Ca_4Si_3O_8(OH, F)_4 \cdot 2H_2O$ |
| 191 | Armstrongite | $CaZr(Si_6O_{15}) \cdot 3\ H_2O$ |
| 192 | Jagoite | $Pb_{18}Fe^{3+}_4[Si_4(Si, Fe^{3+})_6][Pb_4Si_{16}(Si, Fe)_4]O_{82}Cl_6$ |
| 193 | Hyttsjöite | $Pb_{18}Ba_2Ca_5Mn_2^{2+}Fe_2^{3+}[Cl|(Si_{15}O_{45})_2] \cdot 6H_2O$ |
| 194 | Maricopaite | $Ca_2Pb_7(Si_{36}, Al_{12})(O, OH)_{99} \cdot n(H_2O, OH)$ |
| 195 | Cavansite | $Ca(VO)Si_4O_{10} \cdot 4H_2O$ |
| 196 | Pentagonite | $Ca(VO)Si_4O_{10} \cdot 4H_2O$ |
| 197 | Weeksite | $(K, Ba)_2[(UO_2)_2|Si_5O_{13}] \cdot 4H_2O$ |
| 198 | Coutinhoite | $Th_{0.5}(UO_2)_2Si_5O_{13} \cdot 3H_2O$ |
| 199 | Haiweeite | $Ca[(UO_2)_2|Si_5O_{12}(OH)_2] \cdot 6H_2O$ |
| 200 | Metahaiweeite | $Ca(UO_2)_2Si_6O_{15} \cdot nH_2O$ |
| 201 | Monteregianite-(Y) | $KNa_2YSi_8O_{19} \cdot 5H_2O$ |
| 202 | Mountainite | $KNa_2Ca_2[Si_8O_{19}(OH)] \cdot 6H_2O$ |
| 203 | Rhodesite | $KHCa_2Si_8O_{19} \cdot 5H_2O$ |
| 204 | Delhayelithe | $K_7Na_3Ca_5Al_2Si_{14}O_{38}F_4Cl_2$ |
| 205 | Hydrodelhayelithe | $KCa_2AlSi_7O_{17}(OH)_2 \cdot 6H_2O$ |
| 206 | Macdonaldite | $BaCa_4Si_{16}O_{36}(OH)_2 \cdot 10H_2O$ |
| 207 | Cymrite | $Ba(Si, Al)_4(O, OH)_8 \cdot H_2O$ |
| 208 | Kampfite | $Ba_{12}(Si_{11}Al_5)O_{31}(CO_3)_8Cl_5$ |
| 209 | Lourenswalsite | $(K, Ba)_2(Ti, Mg, Ca, Fe)_4(Si, Al, Fe)_6O_{14}(OH)_{12}$ |
| 210 | Tienshanite | $(Na, K)_{9-10}(Ca, Y)_2Ba_6(Mn^{2+}, Fe^{2+}, Ti^{4+}, Zn)_6(Ti, Nb)$ [(O, F, OH)$_{11}$|B$_2$O$_4$|Si$_6$O$_{15}$]$_6$ |
| 211 | Wickenburgite | $Pb_3CaAl[Si_{10}O_{27}] \cdot 3H_2O$ |
| 212 | Silhydritee | $Si_3O_6 \cdot H_2O$ |
| 213 | Magadiite | $Na_2Si_{14}O_{29} \cdot 11H_2O$ |
| 214 | Strätlingite | $Ca_2Al[(OH)_6AlSiO_2(OH)_4] \cdot 2.5\ H_2O$ |
| 215 | Vertumnite | $Ca_4Al_4Si_4O_6(OH)_{24} \cdot 3H_2O$ |
| 216 | Zussmanite | $K(Fe^{2+}, Mg, Mn)_{13}(Si, Al)_{18}O_{42}(OH)_{14}$ |
| 217 | Coombsite | $K(Mn^{2+}, Fe^{2+}, Mg)_{13}[(OH)_7|(Si, Al)_3O_3|Si_6O_{18}]_2$ |

[a] vgl. Mineralienatlas, Mineralklasse VIII/H - Schichtsilikate (Phyllosilikate), Strunz 8 Systematik Most preferably, bentonite from the group of montmorilonites $((Na,Ca)_{0.3}(Al,Mg)_2Si_4O_{10}(OH)_2 \cdot nH_2O)$ is used. Bentonite is a mixture of various clay minerals containing as the main components montmorillonites. Sodium bentonite can take up large amounts of water, and calcium bentonite can take up fats and/or oils.

The layered silicate microparticles and/or nanoparticles are functionalized, non-functionalized, aggregated, non-aggregated, agglomerated, non-agglomerated, supported and/or non-supported. For example, they can be functionalized, agglomerated and supported. However, they can also be non-functionalized and aggregated. They can act as catalysts and/or support the dehalogenation.

Additionally examples of suitable additives are heteropolyacids and isopolyacids, as well as their isomers, lacunar structures and parts of the structures (designated summarily as polyoxometalates POM), in the form of their molecules with the largest molecular diameter of less than or equal to 2 nm, preferably less than or equal to 1.5 nm and, most preferably, equal to or less than 1 nm (designated summarily as POM molecules) as well as in the form of nanoparticles and microparticles of on average particle size of from 1 nm to less than 1000 µm, preferably from 2 nm to 500 µm, more preferably 5 nm to 250 µm, even more preferably 5 nm 150 µm, and, in particular, 5 nm to 100 µm. Hereinafter, they are designated as "POM microparticles" or "POM nanoparticles".

It is emphasized that the indications less than or equal to 2 nm, less than or equal to 1.5 nm and less than or equal to 1 nm does not include a molecular diameter of 0 nm so that the lower limit of the molecular diameter is equal to the largest diameter of the smallest existing POM molecule.

The average particle size of the POM microparticles and POM nanoparticles measured with the help of transmission electron microscopy (TEM), scanning electron microscopy (SEM), scanning transmission electron microscopy (STEM), atomic force microscopy (AFM) or scanning tunnel microscopy (STM) can vary very broadly and, therefore, can be excellently adapted to the requirements of the individual case.

The POM microparticles and POM nanoparticles can have the most diverse morphologies and geometrical forms so that they can be adapted to the requirements of the individual case in this regard.

Thus, they can be compact or they can have at least one hollow and/or any core-shell-structure, wherein the core and the shell can contain or consist of different materials. They also can have most diverse geometrical forms, such as spherules, ellipsoids, cubes, cuboids, pyramides, cones, cylinders, rhomboids, dodecahedrons, blunted dodecahedrons, icosahedrons, blunted icosahedrons, dumbbells, tori, platelets or needles all having circular, oval, elliptic, square, triangular, rectangular, pentagonal, hexagonal, heptagonal, octagonal or starshaped (threepronged, fourpronged, fivepronged, sixpronged or more pronged, the prongs having the same or different lengths) outlines. The corners and the edges can be rounded. Two or more POM microparticles and/or POM nanoparticles can form aggregates or agglomerates. The POM microparticles and/or POM nanoparticles can be of the same type or of different types. For example, spherical POM microparticles and/or POM nanoparticles can have sharp conical outgrowths. Two or three cylinder shaped POM microparticles and/or POM nanoparticles can adhere to each other to form T-shaped or Y-shaped particles. Furthermore, their surface can have indentations so that strawberry-, raspberry- or blackberrylike morphologies result. Last but not least, the dumbbells, tori, platelets or needles can be bent in at least one direction of the space.

For example, the categorization of the POMs according to the following structures is known:
Lindquist hexamolybdate anion, $Mo_6O_{19}^{2-}$,
decavanadate anion, $V_{10}O_{28}^{6-}$,
paratungstate anion B, $H_2W_{12}O_{42}^{10-}$,
$Mo_{36}$-polymolybdate anion, $Mo_{36}O_{112}(H_2O)^{8-}$,
Strandberg structure, $HP_2Mo_5O_{23}^{4-}$,
Keggin structure, $XM_{12}O_{40}^{n-}$,
Dawson structure, $X_2M_{18}O_{62}^{n-}$,
Anderson structure, $XM_6O_{24}^{n-}$,
Allman-Waugh structure, $X_{12}M_{18}O_{32}^{n-}$,
Weakley-Yamase structure, $XM_{10}O_{36}^{n-}$, und
Dexter-Silverton structure, $XM_{12}O_{42}^{n-}$.

The exponent n is an integer from 3 to 20 and designates the valency of an anion which varies according to the variables X und M.

The general formula I to XIII can serve as another principle of classification:

$$(BW_{12}O_{40})^{5-} \tag{I}$$

$$(W_{10}O_{32})^{4-} \tag{II}$$

$$(P_2W_{18}O_{62})^{6-} \tag{III}$$

$$(PW_{11}O_{39})^{7-} \tag{IV}$$

$$(SiW_{11}O_{34})^{8-} \tag{V}$$

$$(HSiW_9O_{34})^{9-} \tag{VI}$$

$$(HPW_9O_{34})^{8-} \tag{VII}$$

$$(TM)_4(PW_9O_{34})^{t-} \tag{VIII}$$

$$(TM)_4(P_2W_{15}O_{56})_2^{t-} \tag{IX}$$

$$(NaP_5W_{30}O_{110})^{14-} \tag{X}$$

$$(TM)_3(PW_9O_{34})_2^{12-} \tag{XI und}$$

$$(P_2W_{18}O_6)^{6-} \tag{XII}$$

In the formulas I to XII, TM designates a bivalent or trivalent transition metal ion like $Mn^{2+}$, $Fe^{2+}$, $Fe^{2+}$, $Co^{2+}$, $Co^{3+}$, $Ni^{2+}$, $Cu^{2+}$ and $Zn^{2+}$. The exponent t is an integer and designates the valency of an anion, which varies in dependency of the variable TM.

Moreover, POM of the general formula XIII come into consideration:

$$(A_xGa_yNb_aO_b)^{z-} \tag{XIII}$$

In the formula XIII, the variable A designates phosphorus, silicon or germanium, and the index x designates 0 or an integer from 1 to 40. The index y designates an integer from 1 to 10, the index a designates an integer of 1 to 8, and the index b is an integer of 15 to 150. The exponent z varies in dependency of the nature and the degree of oxidation of the variable A. Moreover, aqua complexes, and the active fragments of the POM XIII come into question.

When the index x equals 0, y is preferably 6-a, wherein the index a equals an integer of 1 to 5, and the index b equals 19.

When the variable A is silicon or germanium, the index x equals 2, the index y equals 18, the index a equals 6, and the index b equals 77.

When the variable A designates phosphorus, the index x equals 2 or 4, the index y equals 12, 15, 17 or 30, the index a equals 1, 3, or 6, and the index b equals 62 or 123.

Moreover, the isomers of the POM come into question. Thus, the Keggin structure has five isomers: the alpha, beta, gamma, delta, and epsilon structure. Furthermore, defective structures or lacunar structures as well as partial structures come into consideration.

Preferably, the anions I to XIII are used as salts with cations which are approved for cleaning, personal hygiene and pharmaceutical applications.

Examples of suitable cations are:

$H^+$, $Na^+$, $K^+$ and $NH_4^+$, mono-, di-, tri- oder tetra-($C_1$-$C_{20}$-alkylammonium) like pentadecyldimethyl-ferrocenylmethyl ammonium, undecyldimethylferrocenylmethyl ammonium, hexadecyltrimethyl ammonium, octadecyltrimethyl ammonium, didodecyl-dimethyl ammonium, ditetradecyldimethyl ammonium, dihexadecyldimethyl ammonium, dioctadecyldimethyl ammonium, dioctadecylviologen, trioctadecylmethyl ammonium und tetrabutyl ammonium, mono-, di-, tri- oder tetra-($C_1$-$C_{20}$-alkanol ammonium) like ethanolammonium diethanolammonium und triethanolammonium, and monocations of naturally occurring amino acids like histidinium (hish+), argininium (argh+) or lysinium (lysh+) or oligo- or polypeptides with one or more protonated basic amino acid residue(s).

[cf. U.S. Pat. No. 6,020,369, column 3, line 6, to column 4, line 29].

Natural, modified natural and synthetic cationic oligomers and polymers, i.e., oligomers and polymers, which carry primary, secondary, tertiary and quaternary ammonium groups, primary, secondary and tertiary sulfonium groups and/or primary, secondary and tertiary phosphonium groups come into question. Such synthetic oligomers and polymers are customary and known and are used, for example, in electrodeposition paints. Examples for natural oligomers and polymers are polyaminosaccharides like polyglucoseamine and chitosan.

Examples of suitable POM are listed in the TABLE 2

TABLE 2

Molecular Formulas of Polyoxometalates

| No. | Molecular Formulas | Structure Family |
|---|---|---|
| 1 | $[(NMP)_2H]_3PW_{12}O_{40}$ | |
| 2 | $[(DMA)_2H]_3PMo_{12}O_{40}$ | |
| 3 | $(NH_4)_{17}Na[NaSb_9W_{21}O_{86}]$ | Inorganic cryptate |
| 4 | a- und b-$H_5BW_{12}O_{40}$ | " |
| 5 | a- und b-$H_6ZnW_{12}O_{40}$ | " |
| 6 | a- und b-$H_6P_2W_{18}O_{62}$ | " |
| 7 | alpha-$(NH_4)_6P_2W_{18}O_{62}$ | Wells-Dawson-structure |
| 8 | $K_{10}Cu_4(H_2O)_2(PW_9O_{34})_2 \cdot 20H_2O$ | " |
| 9 | $K_{10}Co_4(H_2O)_2(PW_9O_{34})_2 \cdot 20H_2O$ | " |
| 10 | $Na_7PW_{11}O_{39}$ $Na_7PW_{11}O_{39} \cdot 20H_2O + 2\ C_6H_5P(O)(OH)_2$ | " |
| 11 | $[(n-Butyl)_4N]_4H_3PW_{11}O_{39}$ | " |
| 12 | b-$Na_8HPW_9O_{34}$ | " |
| 13 | $[(n-Butyl)_4N]_3PMoW_{11}O_{39}$ | " |
| 14 | a-$[(n-Butyl)_4N]_4Mo8O26$ | " |
| 15 | $[(n-Butyl)_4N]_2W_6O_{19}$ | " |
| 16 | $[(n-Butyl)_4N]_2Mo_6O_{19}$ | " |
| 17 | a-$(NH_4)_nH_{(4-n)}SiW_{12}O_{40}$ | " |
| 18 | a-$(NH_4)_nH_{(5-n)}BW_{12}O_{40}$ | " |
| 19 | a-$K_5BW_{12}O_{40}$ | " |
| 20 | $K_4W_4O_{10}(O_2)_6$ | " |
| 21 | b-$Na_9HSiW_9O_{34}$ | " |
| 22 | $Na_8H_2W_{12}O_{40}$ | " |
| 23 | $(NH_4)_{14}[NaP_5W_{30}O_{110}]$ | Preyssler-structure |
| 24 | a-$(NH_4)_5BW_{12}O_{40}$ | " |
| 25 | a-$Na_5BW_{12}O_{40}$ | " |
| 26 | $(NH_4)_4W_{10}O_{32}$ | " |
| ,,27 | $(Me_4N)_4W_{10}O_{32}$ | " |
| 28 | $(HISH^+)_nH_{(5-n)}BW_{12}O_{40}$ | " |
| 29 | $(LYSH^+)_nH_{(5-n)}BW_{12}O_{40}$ | " |
| 30 | $(ARGH^+)_nH_{(5-n)}BW_{12}O_{40}$ | " |
| 31 | $(HISH^+)_nH_{(4-n)}SiW_{12}O_{40}$ | " |
| 32 | $(LYSH^+)_nH_{(4-n)}SiW_{12}O_{40}$ | " |
| 34 | $(ARGH^+)_nH_{(4-n)}SiW_{12}O_{40}$ | " |
| 35 | $K_{12}[EuP_5W_{30}O_{110}] \cdot 22H_2O^{b)}$ | " |
| 36 | a-$K_8SiW_{11}O_{39}$ | " |
| 37 | $K_{10}(H_2W_{12}O_{42})$ | " |
| 38 | $K_{12}Ni_3(II)(PW_9O_{34})_2 \cdot nH_2O$ | " |
| 39 | $(NH_4)_{10}Co_4(II)(PW_9O_{34})_2 \cdot nH_2O$ | " |
| 40 | $K_{12}Pd_3(II)(PW_9O_{34})_2 \cdot nH_2O$ | " |
| 41 | $Na_{12}P_2W_{15}O_{56} \cdot 18H_2O$ | Lacunare (defect) structure |
| 42 | $Na_{16}Cu_4(H_2O)_2(P_2W_{15}O_{56})_2 \cdot nH_2O$ | " |
| 43 | $Na_{16}Zn_4(H_2O)_2(P_2W_{15}O_{56})_2 \cdot nH_2O$ | " |
| 44 | $Na_{16}Co_4(H_2O)_2(P_2W_{15}O_{56})_2 \cdot nH_2O$ | " |
| 45 | $Na_{16}Ni_4(H_2O)_2(P_2W_{15}O_{56})_2 \cdot nH_2O$ | Wells-Dawson-Sandwich-structure |
| 46 | $Na_{16}Mn_4(H_2O)_2(P_2W_{15}O_{56})_2 \cdot nH_2O$ | " |
| 47 | $Na_{16}Fe_4(H_2O)_2(P_2W_{15}O_{56})_2 \cdot nH_2O$ | " |
| 48 | $K_{10}Zn_4(H_2O)_2(PW_9O_{34})_2 \cdot 20H_2O$ | Keggin-Sandwich-structure |
| 49 | $K_{10}Ni_4(H_2O)_2(PW_9O_{34})_2 \cdot nH_2O$ | " |
| 50 | $K_{10}Mn_4(H_2O)_2(PW_9O_{34})_2 \cdot nH_2O$ | " |
| 51 | $K_{10}Fe_4(H_2O)_2(PW_9O_{34})_2 \cdot nH_2O$ | " |
| 52 | $K_{12}Cu_3(PW_9O_{34})_2 \cdot nH_2O$ | " |
| 53 | $K_{12}(CoH_2O)_3(PW_9O_{34})_2 \cdot nH_2O$ | " |
| 54 | $K_{12}Zn_3(PN_9O_{34})_2 \cdot 15H_2O$ | " |

TABLE 2-continued

Molecular Formulas of Polyoxometalates

| No. | Molecular Formulas | Structure Family |
|---|---|---|
| 55 | $K_{12}Mn_3(PW_9O_{34})_2 \cdot 15H_2O$ | " |
| 56 | $K_{12}Fe_3(PW_9O_{34})_2 \cdot 25H_2O$ | " |
| 57 | $(ARGH^+)_{10}(NH_4)_7Na[NaSb_9W_{21}O_{86}]$ | " |
| 58 | $(ARGH^+)_5HW_{11}O_{39} \cdot 17H_2O$ | " |
| 59 | $K_7Ti_2W_{10}O_{40}$ | " |
| 60 | $[(CH_3)_4N]_7Ti_2W_{10}O_{40}$ | " |
| 61 | $Cs_7Ti_2W_{10}O_{40}$ | " |
| 62 | $[HISH^+]_7Ti_2W_{10}O_{40}$ | " |
| 63 | $[LYSH^+]_nNa_{7-n}PTi_2W_{10}O_{40}$ | " |
| 64 | $[ARGH^+]_nNa_{7-n}PTi_2W_{10}O_{40}$ | " |
| 65 | $[n\text{-Butyl}_4N^+]_3H_3V_{10}O_{28}$ | " |
| 66 | $K_7HNb_6O_{19} \cdot 13H2O$ | " |
| 67 | $[(CH_3)_4N^+]_4SiW_{11}O_{39}\text{---}O[SiCH_2CH_2C(O)OCH_3]_2$ | Organically modified structure |
| 68 | $[(CH_3)_4N^+]_4PW_{11}O_{39}\text{---}(SiCH_2CH_2CH_2CN)$ | " |
| 69 | $[(CH_3)_4N^+]_4PW_{11}O_{39}\text{---}(SiCH_2CH_2CH_2Cl)$ | " |
| 70 | $[(CH_3)_4N^+]_4PW_{11}O_{39}\text{---}(SiCH_2=CH_2)$ | " |
| 71 | $Cs_4[SiW11O_{39}\text{---}(SiCH_2CH_2C(O)OCH_3)_2]_4$ | " |
| 72 | $Cs_4[SiW11O_{39}\text{---}(SiCH_2CH_2CH_2CN)]_4$ | " |
| 73 | $Cs_4[SiW11O_{39}\text{---}(SiCH_2CH_2CH_2Cl)_2]_4$ | " |
| 74 | $Cs_4[SiW11O_{39}\text{---}(SiCH_2=CH_2)]_4$ | " |
| 75 | $[(CH_3)_4N^+]_4SiW_{11}O_{39}\text{---}O\text{---}(SiCH_2CH_2CH_2Cl)_2$ | " |
| 76 | $[(CH_3)_4N^+]_4SiW_{11}O_{39}\text{---}O(SiCH_2CH_2CH_2CN)_2$ | " |
| 77 | $[(CH_3)_4N^+]_4SiW_{11}O_{39}\text{---}O(SiCH_2=CH_2)_2$ | " |
| 78 | $[(CH_3)_4N^+]_4SiW_{11}O_{39}\text{---}O[SiC(CH_3)]_2$ | " |
| 79 | $[(CH_3)_4N^+]_4SiW_{11}O_{39}\text{---}O[SiCH_2CH(CH_3)]_2$ | " |
| 80 | $[(CH_3)_4N^+]_4SiW_{11}O_{39}\text{---}O[SiCH_2CH_2C(O)OCH_3]_2$ | " |
| 81 | $K_5Mn(II)PW_{11}O_{39} \cdot nH_2O$ | With transition metals substituted structure |
| 82 | $K_8Mn(II)P_2W_{17}O_{61} \cdot nH_2O$ | " |
| 83 | $K_6Mn(II)SiW_{11}O_{39} \cdot nH_2O$ | " |
| 84 | $K_5PW_{11}O_{39}[Si(CH_3)_2] \cdot nH_2O$ | " |
| 85 | $K_3PW_{11}O_{41}(PC_6H_5)_2 \cdot nH_2O$ | " |
| 86 | $Na_3PW_{11}O_{41}(PC_6H_5)_2 \cdot nH_2O$ | " |
| 87 | $K_5PTiW_{11}O_{40}$ | " |
| 88 | $Cs_5PTiW_{11}O_{39}$ | " |
| 89 | $K_6SiW_{11}O_{39}[Si(CH_3)_2] \cdot nH_2O$ | " |
| 90 | $KSiW_{11}O_{39}[Si(C_6H_5)(\text{tert.---}C_4H_9)] \cdot nH_2O$ | " |
| 91 | $K_6SiW_{11}O_{39}[Si(C_6H_5)_2] \cdot nH_2O$ | " |
| 92 | $K_7SiW_9Nb_3O_{40} \cdot nH_2O$ | " |
| 93 | $Cs_7SiW_9Nb_3O_{40} \cdot nH_2O$ | " |
| 94 | $Cs_8Si_2W_{18}Nb_6O_{77} \cdot nH_2O$ | " |
| 95 | $[(CH_3)_3NH^+]_7SiW_9Nb_3O_{40} \cdot nH_2O$ | Substituierte Keggin-structure |
| 96 | $(CN_3H_6)_7SiW_9Nb_3O_{40} \cdot nH_2O$ | " |
| 97 | $(CN_3H_6)_8Si_2W_{18}Nb_6O_{77} \cdot nH_2O$ | " |
| 98 | $Rb_7SiW_9Nb_3O_{40} \cdot nH_2O$ | " |
| 99 | $Rb_8Si_2W_{18}Nb_6O_{77} \cdot nH_2O$ | " |
| 100 | $K_8Si_2W_{18}Nb_6O_{77} \cdot nH_2O$ | " |
| 101 | $K_6P_2Mo_{18}O_{62} \cdot nH_2O$ | " |
| 102 | $(C_5H_5N)_7HSi_2W_{18}Nb_6O_{77} \cdot nH_2O$ | " |
| 103 | $(C_5H_5N)_7SiW_9Nb_3O_{40} \cdot nH_2O$ | " |
| 104 | $(ARGH^+)_8SiW_{18}Nb_6O_{77} \cdot 18H_2O$ | " |
| 105 | $(LYSH^+)_7KSiW_{18}Nb_6O_{77} \cdot 18H_2O$ | " |
| 106 | $(HISH^+)_6K_2SiW_{18}Nb_6O_{77} \cdot 18H_2O$ | " |
| 107 | $[(CH_3)_4N^+]_4SiW_{11}O_{39}\text{---}O(SiCH_2CH_3)_2$ | " |
| 108 | $[(CH_3)_4N^+]_4SiW_{11}O_{39}\text{---}O(SiCH_3)_2$ | " |
| 109 | $[(CH_3)_4N^+]_4SiW_{11}O_{39}\text{---}O(SiC_{16}H_{33})_2$ | " |
| 110 | $Li_9P_2V_3(CH_3)_3W_{12}O_{62}$ | " |
| 111 | $Li_7HSi_2W_{18}Nb_6O_{77}$ | " |
| 112 | $Cs_9P_2V_3CH_3W_{12}O_{62}$ | " |
| 113 | $Cs_{12}P_2V_3W_{12}O_{62}$ | " |
| 114 | $K_4H_2PV_4W_8O_{40}$ | " |
| 115 | $Na_{12}P_4W_{14}O_{58}$ | " |
| 116 | $Na_{14}H_6P_6W_{18}O_{79}$ | " |
| 117 | $a\text{-}K_5(NbO_2)SiW_{11}O_{39}$ | " |
| 118 | $a\text{-}K_5(TaO_2)SiW_{11}O_{39}$ | " |
| 119 | $[(CH_3)_3NH^+]_5NbSiW_{11}O_{40}$ | " |
| 120 | $[(CH_3)_3NH^+]_5TaSiW_{11}O_{40}$ | " |
| 121 | $K_6Nb_3PW_9O_{40}$ | Peroxo-Keggin-structure |
| 122 | $[(CH_3)_3NH^+]_5(NbO_2)SiW_{11}O_{39}$ | " |
| 123 | $[(CH_3)_3NH^+]_5(TaO_2)SiW_{11}O_{39}$ | " |
| 124 | $K_4(NbO_2)PW_{11}O_{39}$ | " |
| 125 | $K_7(NbO_2)P_2W_{12}O_{61}$ | " |
| 126 | $[(CH_3)_3NH^+]_7(NbO_2)_3SiW_9O_{37}$ | " |
| 127 | $Cs_7(NbO_2)_3SiW_9O_{37}$ | " |
| 128 | $K_6(NbO_2)_3PW_9O_{37}$ | " |

TABLE 2-continued

Molecular Formulas of Polyoxometalates

| No. | Molecular Formulas | Structure Family |
|---|---|---|
| 129 | $Na_{10}(H_2W_{12}O_{42})$ | " |
| 130 | $K_4NbPW_{11}O_{40}$ | " |
| 131 | $[(CH_3)_3NH_+]_4NbPW_{11}O_{40}$ | " |
| 132 | $K_5NbSiW_{11}O_{40}$ | " |
| 133 | $K_5TaSiW_{11}O_{40}$ | " |
| 134 | $K_7NbP_2W_{17}O_{62}$ | Wells-Dawson-structure |
| 135 | $K_7(TiO_2)_2PW_{10}O_{38}$ | " |
| 136 | $K_7(TaO_2)_3SiW_9O_{37}$ | " |
| 137 | $K_7Ta_3SiW_9O_{40}$ | " |
| 138 | $K_6(TaO_2)_3PW_9O_{37}$ | " |
| 139 | $K_6Ta_3PW_9O_{40}$ | " |
| 140 | $K_8Co_2W_{11}O_{39}$ | " |
| 141 | $H_2[(CH_3)_4N^+]4(C_2H_5Si)_2CoW_{11}O_{40}$ | " |
| 142 | $H_2[(CH_3)_4N^+]_4(iso-C_4H_9Si)_2CoW_{11}O_{40}$ | " |
| 143 | $K_9Nb_3P_2W_{15}O_{62}$ | " |
| 144 | $K_9(NbO_2)_3P_2W_{15}O_{59}$ | " |
| 145 | $K_{12}(NbO_2)_6P_2W_{12}O_{56}$ | Well-Dawson-Peroxo structure |
| 146 | $K_{12}Nb_6P_2W_{12}O_{62}$ | Wells-Dawson-structure continued |
| 147 | $a_2\text{-}K_{10}P_2W_{17}O_{61}$ | " |
| 148 | $K_6Fe(III)Nb_3P_2W_{15}O_{62}$ | " |
| 149 | $K_7Zn(II)Nb_3P_2W_{15}O_{62}$ | " |
| 150 | $(NH_4)_6(a\text{-}P_2W_{18}O_{62})\bullet nH_2O$ | " |
| 151 | $K_{12}[H_2P_2W_{12}O_{48}]\bullet 24H_2O$ | " |
| 152 | $K_2Na_{15}H_5[PtMo_6O_{24}]\bullet 8H_2O$ | " |
| 153 | $K_8[a_2\text{-}P_2W_{17}MoO_{62}]\bullet nH_2O$ | " |
| 154 | $KHP_2V_3W_{15}O_{62}\bullet 34H_2O$ | " |
| 155 | $K_6[P_2W_{12}Nb_6O_{62}]\bullet 24H_2O$ | " |
| 156 | $Na_6[V_{10}O_{28}]\bullet H_2O$ | " |
| 157 | $(Guanidinium)_8H[PV_{14}O_{62}]\bullet 3H_2O$ | " |
| 158 | $K8H[PV14O62]$ | " |
| 159 | $Na_7[MnV_{13}O_{38}]\bullet 18H_2O$ | " |
| 160 | $K_6[BW_{11}O_{39}Ga(OH)_2]\bullet 13H_2O$ | " |
| 161 | $K_7H[Nb_6O_{19}]\bullet 13H_2O$ | " |
| 162 | $[(CH_3)_4N^+/Na^+/K^+]_4[Nb_2W_4O_{19}]$ | " |
| 163 | $[(CH_3)_4N^+]_9[P_2W_{15}Nb_3O_{62}]$ | " |
| 164 | $[(CH_3)_4N^+]_{15}[HP_4W_{30}Nb_6O_{123}]\bullet 16H_2O$ | " |
| 165 | $[Na/K]_6[Nb_4W_2O_{19}]$ | " |
| 166 | $[(CH_3)_4N^+/Na^+/K^+]5[_{Nb3W3O19}]\bullet 6H_2O$ | " |
| 167 | $K_5[CpTiSiW_{11}O_{39}]\bullet 12H_2O$ | " |
| 169 | $b_2\text{-}K_8[SiW_{11}O_{39}]\bullet 14H_2O$ | " |
| 170 | $a\text{-}K_8[SiW_{10}O_{36}]\bullet 12H_2O$ | " |
| 171 | $Cs_7Na_2[PW_{10}O_{37}]\bullet 8H_2O$ | " |
| 172 | $Cs_6[P_2W_5O_{23}]\bullet 7.5H_2O$ | " |
| 173 | $g\text{-}Cs_7[PW_{10}O_{36}]\bullet 7H_2O$ | " |
| 174 | $K_5[SiNbW_{11}O_{40}]\bullet 7H_2O$ | " |
| 175 | $K_4[PNbW_{11}O_{40}]\bullet 12H_2O$ | " |
| 176 | $Na_6[Nb_4W_2O_{19}]\bullet 13H_2O$ | " |
| 177 | $K_6[Nb_4W_2O_{19}]\bullet 7H_2O$ | " |
| 180 | $K_4[V_2W_4O_{19}]\bullet 3.5H_2O$ | " |
| 181 | $Na_5[V_3W_3O_{19}]\bullet 12H_2O$ | " |
| 182 | $K_6[PV_3W_9O_{40}]\bullet 14H_2O$ | " |
| 183 | $Na_9[A\text{-}b\text{-}GeW_9O_{34}]\bullet 8H_2O$ | " |
| 184 | $Na_{10}[A\text{-}a\text{-}GeW_9O_{34}]\bullet 9H_2O$ | " |
| 185 | $K_7[BV_2W_{10}O_{40}]\bullet 6H_2O$ | " |
| 186 | $Na_5[CH_3Sn(Nb_6O_{19})]\bullet 10H_2O$ | " |
| 187 | $Na_8[Pt(P(m\text{-}SO_3C_6H_5)_3)_3Cl]\bullet 3H_2O$ | " |
| 188 | $[(CH_3)_3NH^+]_{10}(H)[Si\,(H)_3W_{18}O_{68}]\bullet 10H_2O$ | " |
| 189 | $K_7[A\text{-}a\text{-}GeNb_3W_9O_{40}]\bullet 18H_2O$ | " |
| 190 | $K_7[A\text{-}b\text{-}SiNb_3W_9O_{40}]\bullet 20H_2O$ | " |
| 191 | $[(CH_3)_3NH^+]_9[A\text{-}a\text{-}HGe_2Nb_6W_{18}O_{78}$ | " |
| 192 | $K_7(H)[A\text{-}a\text{-}Ge_2Nb_6W_{18}O_{77}]\bullet 18H_2O$ | " |
| 193 | $K_8[A\text{-}b\text{-}Si_2Nb_6W_{18}O_{77}]$ | " |
| 194 | $[(CH_3)_3NH^+]_8[A\text{-}B\text{-}Si_2Nb_6W_{18}O_{77}]$ | " |

[a)] cf. U.S. Pat. No. 6,020,369, TABLE 1, columns 3 to 10;
[b)] Tierui Zhang, Shaoquin Liu, Dirk G. Kurth und Chari F. J. Faul, »Organized Nanostructured Complexes of Polyoxometalates and Surfactants that Exhibit Photoluminescence and Electrochromism, Advanced Functional Materials, 2009, 19, pages 642 bis 652;
n a number, in particular an integer from 1 to 50.

Additional examples of suitable POM are known from the American patent U.S. Pat. No. 7,097,858 column 14, line 56 to column 17, line 19 and from TABLE 8a, column 22, line 41, to column 23, line 28, compounds No. 1-53, and TABLE 8b, column 23, line 30, to column 25, line 34, compounds No. 1 to 150.

Particularly preferred are
ammoniumheptamolybdate tetrahydrate $\{(NH_4)_6Mo_7O_{24}\}\cdot 4H_2O$, CAS-No. 13106-76-8 (wasserfrei), CAS-Nr. 12054-85-2 (Tetrahydrat), AHMT$\}$,
tungstenphosphoric acid hydrate $\{H_3P(W_3O_{10})_4\}\cdot xH_2O$, CAS-No. 1343-93-7 (free of water), CAS-No. 12067-99-1 (hydrate), Wo-Pho$\}$,
molybdatophosphoric acid hydrate, $\{H_3P(Mo_3O_{10})_4\}\cdot xH2O$, CAS-No.: 12026-57-2 (wasserfrei), CAS-Nr. 51429-74-4 (Hydrat), Mo-Pho$\}$ und/oder
tungstensilicic acid $\{H_4[Si(W_3O_{10})_4]\cdot xH_2O$, CAS-No. 12027-43-9, WKS$\}$ and/or their salts.

The POM described hereinbefore in detail are characterized by their thermal stability and they render the valuable products biocidal and virucidal. In particular, the act against mollicutes, especially, mycoplasmata.

Additional examples for suitable additives are non-functionalized or amino, hydroxyl, and/or carboxyl functionalized graphenes.

Further examples for suitable additives are reactive gases and liquids, which can be (co-) polymerized with the originating valuable products like acetylene, ethylene, propylene, isopropene, butadiene and further mono- or multifunctional or other olefinically unsaturated monomers, monomers for the polyaddition like diisocyanates, monomers for the polycondensation like carboxylic acid anhydrides, carboxylic acids and hydroxy compounds as well as syngas.

More examples for suitable additives are oxygen activated by actinic radiation, wherein actinic radiation is understood to be UV radiation, x-rays and electron beams, organic and inorganic peroxides like the customary and known thermal radical initiators and peroxosulfuric acid, peroxodisulfuric acid, peroxoacetic acid, sodium peroxide and barium peroxide as well as ozone.

A particularly broad range of valuable products can be produced with the help of the mechanochemical process of the invention. In the context of the present invention, valuable products can be understood to mean materials, which are not down-recycled but up-recycled or, in other words, which are not less valuable than their starting products, but have a higher value.

Thus, the following valuable products which are free from persistent organic contaminants (POP) and/or other organic halogen compounds, can be produced:

Plastics, wherein the organic halogen compounds are at least reduced or completely eliminated, such as completely dehalogenated PVC or PVDC,
polymers which form copolymers, blockcopolymers, graftcopolymers, combcopolymers and polymer blends from otherwise incompatible polymers,
polymers having a modified surface which is significantly stronger cross-linked by radical reactions at the ends of the polymers,
polymers with a diamondoidal reinforcement,
polymers with a graphene insertion which causes a particularly high stabilization,
polymer composite materials with the aforementioned fibers, nanoparticles and additives, which are activated by the mechanochemical processing and enter into very strong bonds in a particularly highly dispersed embedded state with the polymers, which effect cannot not be achieved by mechanical or chemical treatment alone and which renders the valuable products significantly more stable,
microcrystalline and nanocrystalline co-crystals of the polymers with the aforementioned nanoparticles and microparticles which are built up during the mechanochemical treatment by selforganization,
polymer composite materials, polymer alloys and microcrystalline and nanocrystalline co-crystals, which are doped with impurity atoms, such as, for example, scandium, yttrium, lanthanum, the lanthanides, uranium, titanium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminium, gallium, indium, thallium, silicon, germanium, tin, lead, nitrogen, phosphorus, arsenic, antimony, bismuth, oxygen, sulfur, selenium and/or tellurium; the respective valuable products are valuable catalysts and can have mesoporous properties,
copolymers with superabsorbers,
superabsorbers by addition of oxygen radicals, peroxides and/or ozone, which can enter into reactions with the radicals at the end groups of the polymers,
MOFs, rotaxanes, cage-like compounds, metalorganic lattice works and self organizing systems,
mesoporous materials with different pore sizes, pore size distributions, degrees of cross-linking, mesh-values, hydrophobic, superhydrophobic, hydrophilic, superhydrophilic and hydrophilic-hydrophobic polarities and/or thermal and electric conductivities and/or magnetic properties,
polymer additives which are particularly homogeneously distributed in the valuable polymeric products and have novel applicational properties, such as a reinforcement against pressure, shearing forces and/or tensile forces, resilience towards weathering, radiation and/or chemicals, a denser cross-linking, a low solubility, a lower swelling because of a dense cross-linking and/or a better capability to bind water or lipids,
composites for building materials filled with sand, in particular with desert sand, and
topological materials (cf. Technology Review, November 2017, page 83).

The broad range of valuable products which is obtained by the mechanochemical process of the invention, corresponds to the numerous possibilities to use the valuable products. Thus, they can be used as high-grade polymeric engineering materials, polymer additives, reversible and irreversible absorbents for water or oils, for the desalination of seawater and of oversalted soils, as catalysts, as electrode materials for batteries, as building materials and for the manufacture of shielding of electrical and magnetic fields.

The essential advantage of these valuable products is that they are no longer a source for persistent contaminants (POP) and organic halogen compounds.

EXAMPLES

Example 1: The Mechanochemical Preparation of a High Temperature Stable, Sterilizable Polymer Composite from POP-Contaminated Polymer Wastes Discarded moldings of polyether ketone (PEK) and polyether sulfone (PES), to which residues of metal-plastic pieces still adhered, were mixed with each other in a weight ratio of 1:1 and were shredded in a shredder to an average particle size of 100 μm. The portion of coarse parts of a particle size larger than 500 μm was again shredded until the desired average particle size of 100 μm was achieved.

In a ball mill of corresponding size, wherein 80% of the volume were filled with tungsten carbide balls of a diameter of 20 mm, 2 kg of the shredded PEK-PES-mixture were contaminated with 0.1 g PCB (about 0.005% by weight) by milling for 30 minutes at room temperature. Thereby, the average particle size was reduced to 1 μm.

Thereafter, 40 g (4% by weight) of tungstensilicic acid $\{H_4[Si(W_3O_{10})_4]\cdot xH_2O$, CAS-No. 12027-43-9$\}$ were added to the contaminated PEK-PES mixture, whereafter the resulting mixture was again milled for 30 minutes at room temperature. This way, the average particle size was further reduced to 500 nm. Thereafter, 30 g of butyl amine and 50 g tetraethyleneglycol dimethylether were admixed during 5 minutes by milling at room temperature. The resulting mixture was milled at room temperature for 3 hours with magnesium chips.

The resulting valuable product was separated from the tungsten carbide balls and was freed from the water-soluble components (magnesium chloride, butyl amine, tetraethyleneglycol dimethylether and by-products). The valuable product involved a powder-like, thermoplastic PEK-PES alloy, wherein the otherwise incompatible polymers did not form separate PEK and PES domains. The average particle size was 100 nm and the content of tungstensilicic acid was 4.2% by weight. It was confirmed by gas chromatographic measurements with an electron capturing detector and decachlorobiphenyl as an internal standard that 99.7% of the original amount of PCB had been removed.

The resulting valuable product could be moulded to yield high temperature resistant, shock-resistant, sterilizable parts, like hilts for surgical devices. These hilts were permanently protected from the contamination with mollicutes, in particular, with mycoplasmata.

Example 2: The Mechanochemical Preparation of a Biochar Filled Thermoplastic Material which is Free from Organic Halogen and Organic Bromine In a ball mill of corresponding size, wherein 80% of the volume were filled with tungsten carbide balls of a diameter of 20 mm, 2 kg of shredded parts of a bilayer aluminum-EPDM foil, the polymer part of which contained 1.5% by weight of dekabromodiphenylether (approximately 25 g) as a flame retardant were contaminated with 0.1 g PCB (approximately 0.005% by weight) by grinding at room temperature for 30 minutes. This way, the average particle size was reduced to 1 μm.

The PCB-contaminated parts were mixed with 10% by weight, based on the polymer parts, of husks by grinding at room temperature for 1 hour. This way, the husks were converted into biochar, and the average particle size of the resulting mixture sank to 600 nm.

A dispersion or solution of 30 g finally divided sodium in 50 g tris(hydroxyethyl)amine and 10 g of tetraethyleneglycol was prepared separately under argon and added to the ball mill under argon. The resulting mixture was milled at room temperature for 3 hours. The resulting product mixture was separated from the tungsten carbide balls and, if necessary, metallic sodium still present was carefully destroyed with ethanol. Thereafter, the product mixture was freed from water-soluble compounds (sodium chloride, sodium bromide, aluminum chloride, tris(hydroxyethyl)amine and triethyleneglycol with water and dried.

The resulting dried valuable product was free from aluminum. The bio charcoal which was formed in situ was homogeneously distributed in the EPDM. It was confirmed by gas chromatographic measurements with an electron capturing detector and decachlorobiphenyl as an internal standard that 99.7% of the original amounts of the PCB and 99.9% of the original amounts of the dekabromodiphenylether had been removed.

The EPDM highly filled with biochar could be processed thermoplastically, exhibited excellent elasticity and absorbed contaminants from the air. Because of this, the valuable product could be used advantageously in interiors.

Example 3: The Mechanochemical Preparation of a Polymer Concrete Filled with Desert Sand and Having a Particularly Low Content of Polymeric Binders In a ball mill of corresponding size, wherein 80% of the volume were filled with tungsten carbide balls of a diameter of 20 mm, 10 kg of the desert sand from a sand dune was contaminated with 0.5 g PCB (approximately 0.005% by weight) by milling for 1 hour at room temperature. This way, the average particle size of the desert sand was reduced to 500 μm. A sieve analysis showed a narrow monomodal particle size distribution. Under the microscope the sand particles showed fissures. 0.50 kg of shredded polymer wastes of an average particle size of 1 mm were added. The polymer wastes consisted of 0.2 kg polyethylene terephthalate, 0.2 kg polyepoxide and 0.1 kg polyoxymethylene. The resulting mixture was milled for 30 minutes. Thereafter, 50 g of the graphite intercalation compound $C_8K$ were added under dried nitrogen, and the resulting mixture was milled for 2 hours.

The resulting gray valuable product was separated from the milling balls and its chlorin content was determined. It turned out that nearly 100% of the organically bound chlorine had been converted into inorganic chloride. For further use, it was not necessary to separate the inorganic chlorides. The grey valuable product was a free-flowing powder, with an average particle size of 400 μm as determined by sieve analysis. It contained only 5 5% by weight of organic polymers. Nevertheless, the valuable product could be compressed under bars at a temperature of 100° C. to give stable molded parts.

We claim:

1. A mechanochemical process for preparation of products free from organic halogen compounds, from disposable waste of mixed and unmixed plastics and plastic laminates, said plastics and plastic laminates being contaminated with organic halogen compounds, the process comprising the process steps of:
    (i) shredding the disposable waste containing the organic halogen compounds,
    (ii) milling the shredded waste into a mill containing milling balls,
    (iii) adding at least one reductive dehalogenating agent, selected from the group consisting of
        solutions of alkali metals and alkaline earth metals in liquid ammonia, liquid amines or aqueous solvents,
        Zintl phases,
        graphite intercalation compounds of alkali metals,
        saline hydrides, complex hydrides, complex transition metal hydrides or metal hydrides, aluminum, iron, zinc, lanthanum, the lanthanides and the actinides, into the milled shredded waste to form an admixture, (iv) further milling the admixture containing milled shredded waste and the at least one reductive dehalogenating agent, the further milling providing mechanical energy for a reaction of the at least one reductive dehalogenating agent with the organic halogen compounds to change structure of the admixture, (v)
(a) separating the milling balls, and
(b) separating formed halogen containing water-soluble products by washing with aqueous solvents, and (vi) checking washed water-insoluble products after drying as to whether they still contain the organic halogen compounds, and (vii) before and/or after the process step (iv) adding at least one additive, selected from the group consisting of charcoals, bio charcoals, pyrogenic char, polyoxometalates and sands.

2. The mechanochemical process of claim 1, wherein the products free from organic halogen compounds are selected from the group consisting of:

plastics, wherein the organic halogen compounds are at least reduced or completely eliminated, polymers which form copolymers, blockcopolymers, graftcopolymers, combcopolymers and polymer blends from otherwise incompatible polymers, polymers having a modified surface cross-linked by radical reactions at the ends of the polymers, polymers with a diamondoidal reinforcement, polymers with a graphene insertion providing high stabilization, polymer composite materials activated by the mechanochemical process, microcrystalline and nanocrystalline co-crystals of the polymers built up during the mechanochemical process by self organization, polymer composite materials, polymer alloys and microcrystalline and nanocrystalline co-crystals, doped with impurity atoms, selected from the group consisting of scandium, yttrium, lanthanum, the lanthanides, uranium, titanium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, silicon, germanium, tin, lead, nitrogen, phosphorus, arsenic, antimony, bismuth, oxygen, sulfur, selenium and/or tellurium, copolymers with superabsorbers, superabsorbers by addition of oxygen radicals, peroxides and/or ozone, reacting with the radicals at end groups of the polymers, MOFs, rotaxanes, cage-like compounds, metalorganic lattice works and selforganizing systems, mesoporous materials with different pore sizes, pore size distributions, degrees of cross-linking, mesh-values, hydrophobic, superhydrophobic, hydrophilic, superhydrophilic and hydrophilic-hydrophobic polarities and/or thermal and electric conductivities and/or magnetic properties, polymer additives homogeneously distributed in the polymeric products and have applicational properties, including a reinforcement against pressure, shear forces and/or tensile forces, resilience towards weathering, radiation and/or chemicals, a higher cross-linking, a lower solubility, a lower swelling because of a higher cross-linking, a lower solubility, a lower swelling because of cross-linking and/or a better capability to bind water or lipids, sand-filled composites for building materials, and topological materials.

3. The mechanochemical process of claim 2, wherein the composites for building materials are filled with desert sand.

4. The mechanochemical process of claim 2, further comprising manufacturing materials comprising the products free from organic halogen compounds, the materials being selected from the group consisting of high-grade polymeric engineering materials, polymer additives, reversible and irreversible absorbents for water or oils, materials for desalination of seawater and of oversalted soils, catalysts, electrode materials for batteries, building materials and shieldings of electrical and magnetic fields.

5. The mechanochemical process of claim 1, wherein the at least one additive comprises tungstensilicic acid $H_4[Si(W_3O_{10})_4]$.

6. The mechanochemical process of claim 1, wherein the disposable waste comprises polyether ketone (PEK) and polyether sulfone (PES) moldings contaminated with polychlorobiphenyl (PCB).

7. The mechanochemical process of claim 1, wherein the disposable waste comprises aluminum-EPDM (ethylene propylene diene monomer) polymer bilayer foil contaminated with polychlorobiphenyl (PCB).

* * * * *